United States Patent
Leonard et al.

(10) Patent No.: US 9,770,960 B2
(45) Date of Patent: Sep. 26, 2017

(54) SUSPENSION ISOLATION ASSEMBLIES AS WELL AS SUSPENSION SYSTEMS INCLUDING SAME

(71) Applicant: FIRESTONE INDUSTRIAL PRODUCTS COMPANY, LLC, Indianapolis, IN (US)

(72) Inventors: Joshua R. Leonard, Noblesville, IN (US); Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/796,922

(22) Filed: Jul. 10, 2015

(65) Prior Publication Data
US 2016/0009156 A1    Jan. 14, 2016

Related U.S. Application Data

(60) Provisional application No. 62/023,167, filed on Jul. 10, 2014.

(51) Int. Cl.
*B60G 99/00*    (2010.01)

(52) U.S. Cl.
CPC .................. *B60G 99/00* (2013.01)

(58) Field of Classification Search
CPC .... B60G 99/00; B60G 99/02; B60G 2202/40; B60G 99/002
USPC .......... 296/65.02, 65.12, 65.14, 65.15, 65.18
See application file for complete search history.

(56) References Cited

U.S. PATENT DOCUMENTS

| | | | | |
|---|---|---|---|---|
| 1,510,969 A | * | 10/1924 | Watrous | B60N 2/20 248/424 |
| 2,360,805 A | * | 10/1944 | Thoma | B60N 2/06 248/430 |
| 2,667,912 A | * | 2/1954 | McCormick | B60N 2/0705 192/22 |
| 4,423,904 A | * | 1/1984 | Crawford | B60N 2/123 248/393 |
| 4,529,158 A | * | 7/1985 | Sautter, Jr. | B60N 2/1803 248/393 |
| 2006/0237885 A1 | * | 10/2006 | Paillard | B60N 2/501 267/140.15 |

* cited by examiner

*Primary Examiner* — Jason S Morrow
*Assistant Examiner* — E Turner Hicks
(74) *Attorney, Agent, or Firm* — Thomas R. Kingsbury; Fay Sharpe LLP

(57) ABSTRACT

A suspension actuation assembly can include first and second support assemblies that are displaceable relative to one another in a first direction of travel. A cable-tensioning assembly can be operatively disposed between the supporting and supported structures. A torsional spring and isolator assembly can be operatively secured to the supported structure. An elongated cable can be operatively connected between the cable-tensioning assembly and the torsional spring and isolator assembly such that associated loads acting on the supported structure displace the cable-tensioning assembly and thereby tension the elongated cable against the torsional spring and isolator assembly to support the load acting on the supported structure while isolating. A suspension system including such a suspension actuation assembly is also included.

20 Claims, 16 Drawing Sheets

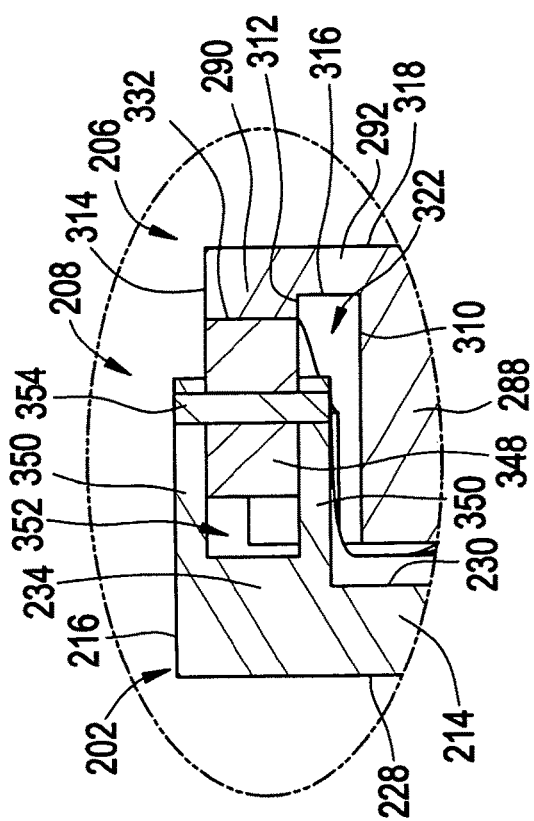
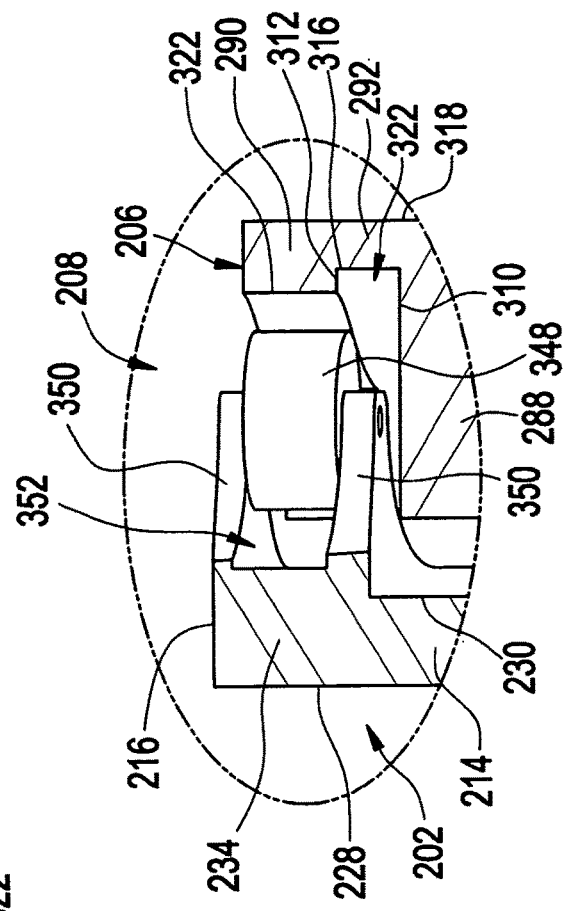
FIG. 13
FIG. 17

SUSPENSION ISOLATION ASSEMBLIES AS WELL AS SUSPENSION SYSTEMS INCLUDING SAME

This application claims the benefit of priority from U.S. Provisional Patent Application No. 62/023,167, filed on Jul. 10, 2014, the subject matter of which is hereby incorporated herein by reference in its entirety.

BACKGROUND

The subject matter of the present disclosure broadly relates to the art of support structures and suspension systems and, more particularly, to suspension systems that include at least one torsional spring and isolator assembly operatively connected between supported and supporting structures. Using such an arrangement, forces and loads between the supported and supporting structures can be carried by at least the torsional spring and isolator assembly while the same can be operative to isolate vibrations acting on at least one of the supported and supporting structures. In some cases, such a suspension system can also include a cable-tensioning assembly and one or more cables that are operatively connected with the torsional spring and isolator assembly.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with pressurized gas reservoirs of non-wheeled vehicles and/or support structures associated with industrial machinery, components thereof and/or other such equipment. Accordingly, the subject matter of the present disclosure is not intended to be limited to use associated with pressurized gas systems of wheeled vehicles.

In some cases, it has been deemed desirable to reduce the overall weight of motor vehicles, such as to improve fuel efficiency and/or to increase the transportable payload for the same gross weight vehicle. Reducing the weight of one or more components of a suspension system of vehicles, such as those supporting an operator or operator compartment (e.g., cab) can be one contributing factor to achieving such a goal. In many cases, conventional suspension systems have been designed and constructed from metal materials to provide desired performance characteristics, such as strength, rigidity, and robustness of connection with the associated components and/or structures. Reducing the size of such components could be useful in contributing to the reduced weight of a vehicle suspension system, such as has been described above. However, it has been recognized that such size reductions can, in some cases, result in a corresponding reduction in performance.

Notwithstanding the widespread usage and overall success of conventional designs for suspension systems that are known in the art, it is believed that a need exists to meet these competing goals while still retaining comparable or improved performance, ease of manufacture, ease of assembly, ease of installation and/or reduced cost of manufacture, and/or otherwise advance the art of support structures and suspension systems associated therewith.

BRIEF DESCRIPTION

One example of a suspension system in accordance with the subject matter of the present disclosure can be dimensioned for securement between associated structural components, such as a supporting structure and a supported structure. The suspension system can include at least one torsional spring and isolator assembly secured between supported and supporting structures such that forces and loads between the supported and supporting structures can be carried by at least the torsional spring and isolator assembly while isolating vibrations acting on at least one of the supported and supporting structures.

In some cases, a suspension system in accordance with the subject matter of the present disclosure can, optionally, include a cable-tensioning assembly and one or more cables that are operatively connected with the torsional spring. In such cases, forces and loads between the supported and supporting structures can be converted by the cable-tensioning assembly into tensile forces acting on the one or more cables. The tensile forces can be communicated to the at least one torsion spring such that forces and loads between the supported and supporting structures can be carried by at least the torsional spring.

One example of a vehicle in accordance with the subject matter of the present disclosure can include a supporting structure and a supported structure of that is displaceable relative to the supporting structure in a first direction of travel. A cable-tensioning assembly can be operatively disposed between the supporting and supported structures. A torsional spring and isolator assembly can be operatively secured to the supported structure. An elongated cable can be operatively connected between the cable-tensioning assembly and the torsional spring and isolator assembly such that a load acting on the supported structure can displace the cable-tensioning assembly and thereby tension the elongated cable against the torsional spring and isolator assembly to support the load acting on the support structure while isolating vibrations acting on at least one of the supported and supporting structures.

BRIEF DESCRIPTION OF THE DRAWINGS

FIG. 13 is an enlarged view of the portion of the torsional spring and isolator assembly identified as Detail 13 in FIG. 11.

FIG. 17 is an enlarged view of the portion of the torsional spring and isolator assembly identified as Detail 17 in FIG. 15.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
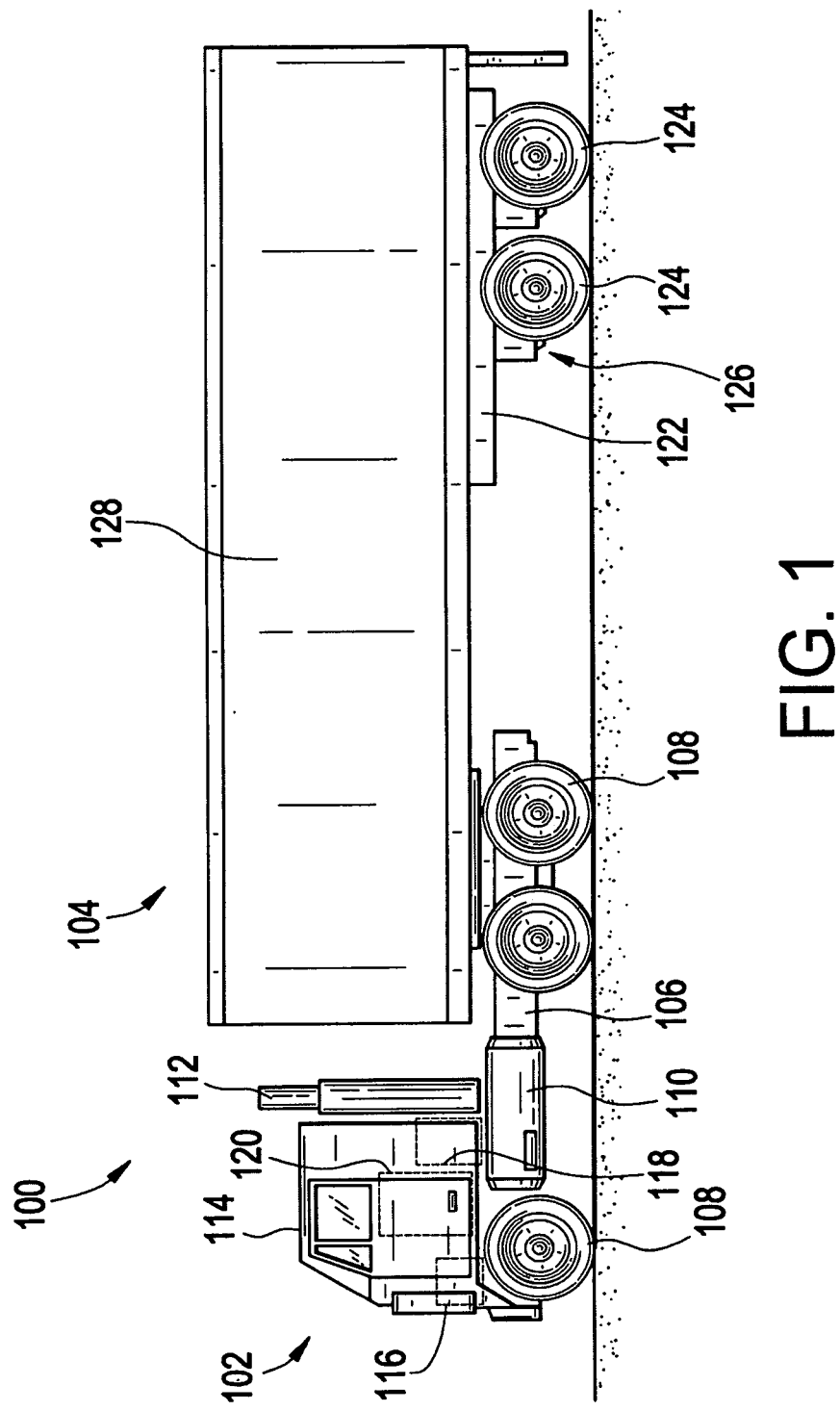
FIG. 1 is a graphical representation of one example of a vehicle including one or more suspension systems in accordance with the subject matter of the present disclosure.

With reference to FIG. 1, a vehicle 100 is shown as taking the form of a tractor-trailer combination that includes an over-the-road tractor 102 and a trailer 104 that is operatively connected to the tractor for over-the-road transport. Tractor 102 is shown as including a frame 106 that is supported on a plurality of wheels 108 by a tractor suspension system (not shown). Tractor 102 will typically also include an internal combustion engine (not shown) and drivetrain (not shown) that are supported on the frame and provide motive power to one or more of wheels 108. Tractor 102 can include a fuel tank 110 and an exhaust stack 112 that are operatively associated with the engine.

Tractor 102 can also include a passenger compartment or cab 114 that can be supported on or along frame 106 in any suitable manner, such as by way of one or more cab mounts and/or one or more cab suspensions, which are respectively represented in FIG. 1 by dashed boxes 116 and 118. Typically, a cab, such as cab 114, for example, will also include one or more seats supported within the cab for use by an operator and, in some cases, one or more passengers, such as is represented in FIG. 1 by dashed box 120, for example. Trailer 104 is shown as including a frame 122 that is supported on a plurality of wheels 124 by a trailer suspension system 126. Trailer 104 can also include a trailer body 128 that is at least partially supported on frame 122 and is generally dimensioned to receive and retain a quantity of cargo.

Figure 2:
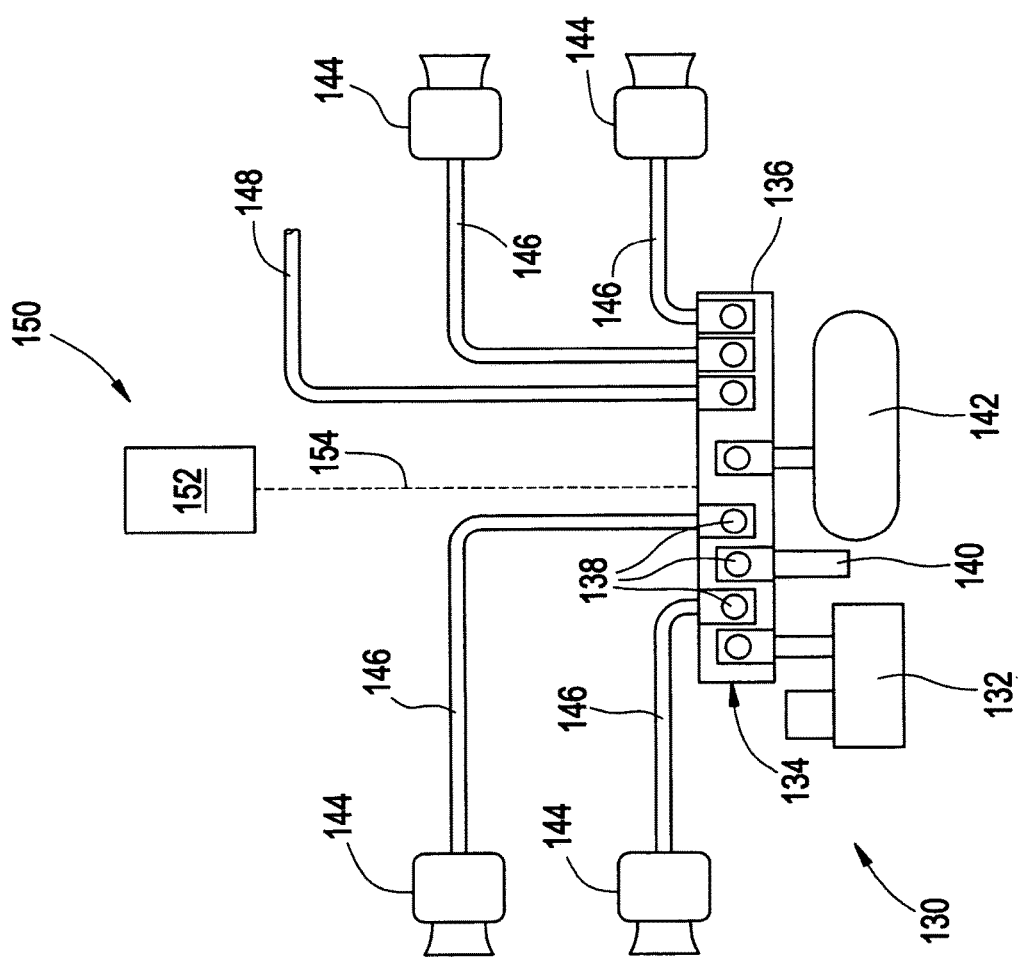
FIG. 2 is a greatly simplified schematic representation of one example of a pressurized gas system adapted for operative association with a suspension system in accordance with the subject matter of the present disclosure.

It will be appreciated that numerous components and/or systems of vehicle 100 can utilize pressurized gas (e.g., air) as a power source for the operation thereof. As non-limiting examples, such components and/or systems can include a tractor suspension system, a tractor braking system, a cab suspension, a trailer suspension system and/or a trailer braking system. One greatly-simplified example of a pressurized gas system 130 that can be operatively associated with one or more of the components and/or systems of vehicle 100 is shown in FIG. 2. Pressurized gas system 130 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 130 includes a pressurized gas source, such as a compressor 132, for example, for generating pressurized air or other gases. A control device, such as a valve assembly 134, for example, is shown as being in communication with compressor 132 and can be of any suitable configuration or arrangement. In the exemplary embodiment shown, valve assembly 134 includes a valve block 136 with a plurality of valves 138 supported thereon. Valve assembly 134 can also, optionally, include a suitable exhaust, such as a muffler 140, for example, for venting pressurized gas from the system. Pressurized gas system 130 can also, optionally, include a reservoir 142, which is shown as being in fluid communication with the compressor and/or the valve assembly and suitable for storing pressurized gas at an elevated pressure for an extended period of time, such as minutes, hours, days, weeks or months.

In some cases, the tractor suspension system and/or the trailer suspension system can include one or more gas spring assemblies 144, which can be of a conventional construction. In the arrangement shown in FIG. 2, valve assembly 134 is in communication with gas spring assemblies 144 through gas transfer lines 146. As such, pressurized gas can be selectively transferred into and/or out of the gas spring assemblies through valve assembly 134 by selectively operating valves 138. Pressurized gas system 130 can also, optionally, be operatively associated with one or more other components and/or systems, such as a gas spring or actuator operatively associated with one or more other suspension systems, for example. As such, pressurized gas system 130 is shown as including a gas transfer line 148 that is operatively associated with one of valves 138 of valve assembly 134. It will be appreciated that gas transfer line 148 can be utilized to selectively transfer pressurized gas into and/or out of any such gas spring assemblies, actuators and/or other components, such as may be described hereinafter, for example. As indicated above, it will be appreciated that pressurized gas system 130 is greatly simplified and merely illustrates one example of a pressurized gas system with which they pressurized gas reservoir in accordance with the subject matter of the present disclosure can be used.

In some cases, pressurized gas system 130 can include a control system 150 that is capable of communication with any one or more systems and/or components (not shown) of vehicle 100, such as for selective operation and/or control thereof. Control system 150 can include a controller or electronic control unit (ECU) 152 communicatively coupled with compressor 132 and/or valve assembly 134, such as through a conductor or lead 154, for example, for selective operation and control thereof, which can include supplying and exhausting pressurized gas to and/or from the pressurized gas system. It will be appreciated that controller 152 can be of any suitable type, kind and/or configuration.

It will be appreciated that the tractor suspension system and trailer suspension system 126 referred to above represent the primary suspension systems of vehicle 100 by which the sprung masses, such as frame 106, cab 114, frame 122 and trailer body 128, for example, are supported on the unsprung masses of the vehicle, such as one or more axles and wheels 108 and 124, for example. As mentioned above, a vehicle, such as vehicle 100, for example, can also include one or more secondary or other (i.e., non-primary) suspension systems that provided for increased performance and/or ride quality of the vehicle. Examples of components that can include or can be otherwise connected by way of such a secondary suspension system can include cab mounts 116 and/or cab suspensions 118 that operatively connect cab 114 with frame 106. Another example of components that can include or can be otherwise connected by way of such a secondary suspension system can include seat suspension 120 that operatively connects a seat for an operator and/or passenger with cab 114. It will be recognized and understood that a suspension system in accordance with the subject matter of the present disclosure may be suitable for use as any one or more of the foregoing and/or other examples of secondary suspension systems for vehicles and/or primary suspension systems in other applications and/or environments of use.

Figure 3:
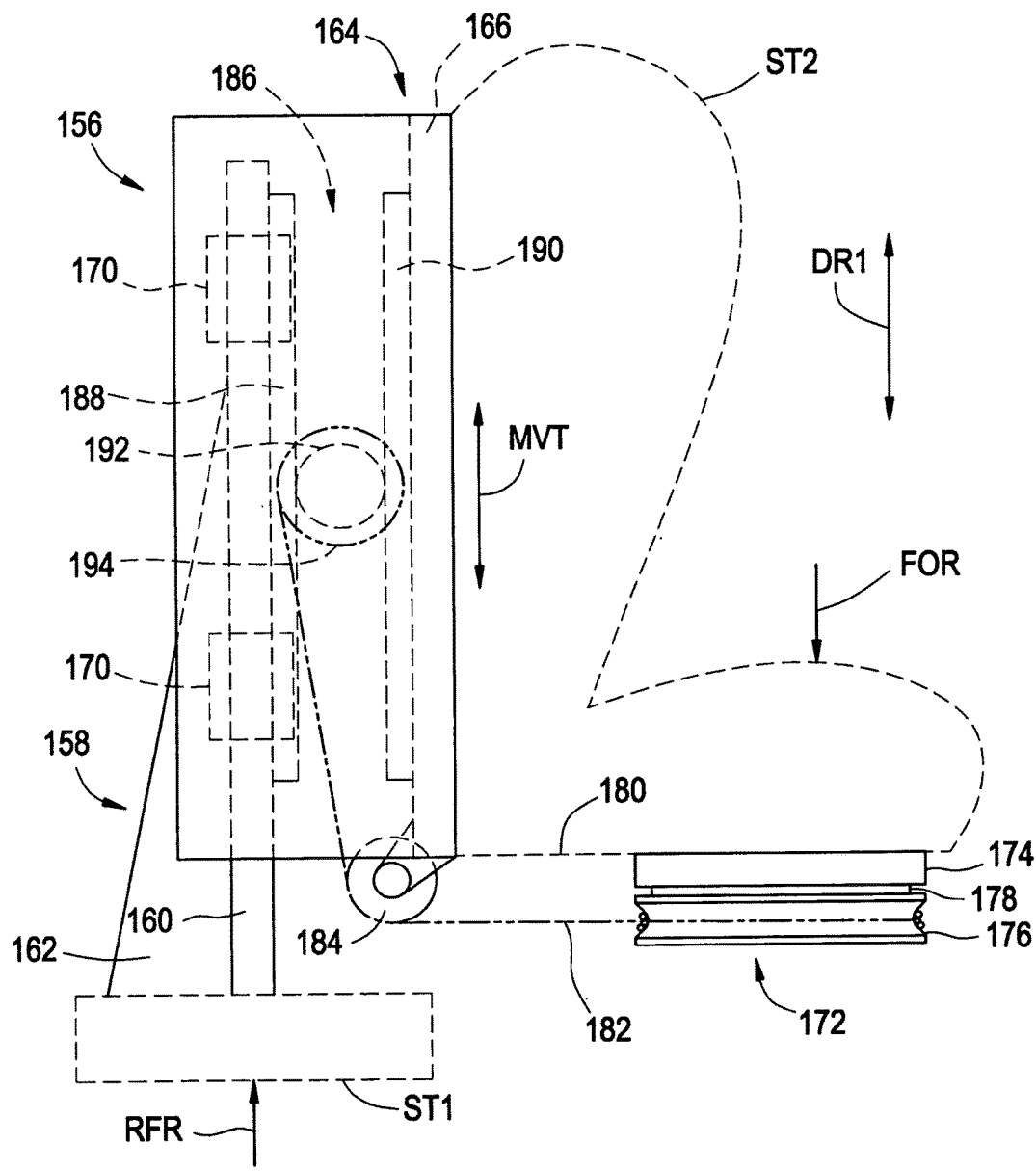
FIG. 3 side elevation view of one example of a suspension system in accordance with the subject matter of the present disclosure.

One example of a suspension system in accordance with the subject matter of the present disclosure is shown in FIGS. 3-6 as suspension system 156, which is shown and described herein as being operatively disposed between a first or supporting structure ST1 and a second or supported structure ST2. It will be appreciated that structures ST1 and ST2 can represent any suitable structural components that are operatively connected to one another and between which it may be desirable to permit relative movement. In some cases, one structural component may be deemed stationary with the other structural component deemed to be displaceable. In other case, both structural components may be deemed to be displaceable. In either case, structures ST1 and ST2 may be capable of undergoing movement relative to one another, as is represented in FIG. 3 by arrow MVT.

Typically, a suspension system in accordance with the subject matter of the present disclosure, such as suspension system 156, for example, will be utilized to support a load or otherwise transfer a force to, from and/or between structures ST1 and ST2. As one example, structure ST1 can be representative of a frame or floor of cab 114 and structure ST2 can be representative of a seat for an operator and/or passenger. In which case, suspension system 156 can be representative of a seat suspension that is capable of permitting structure ST2 (e.g., the seat) to move relative to structure ST1 (e.g., the frame or floor of the cab). Suspension system 156 can also transfer a force, which is represented by force arrow FOR (e.g., the weight of an operator), from structure ST2 to structure ST1, which can support force FOR, as is represented by reaction force arrow RFR in FIG. 3.

Figure 4:
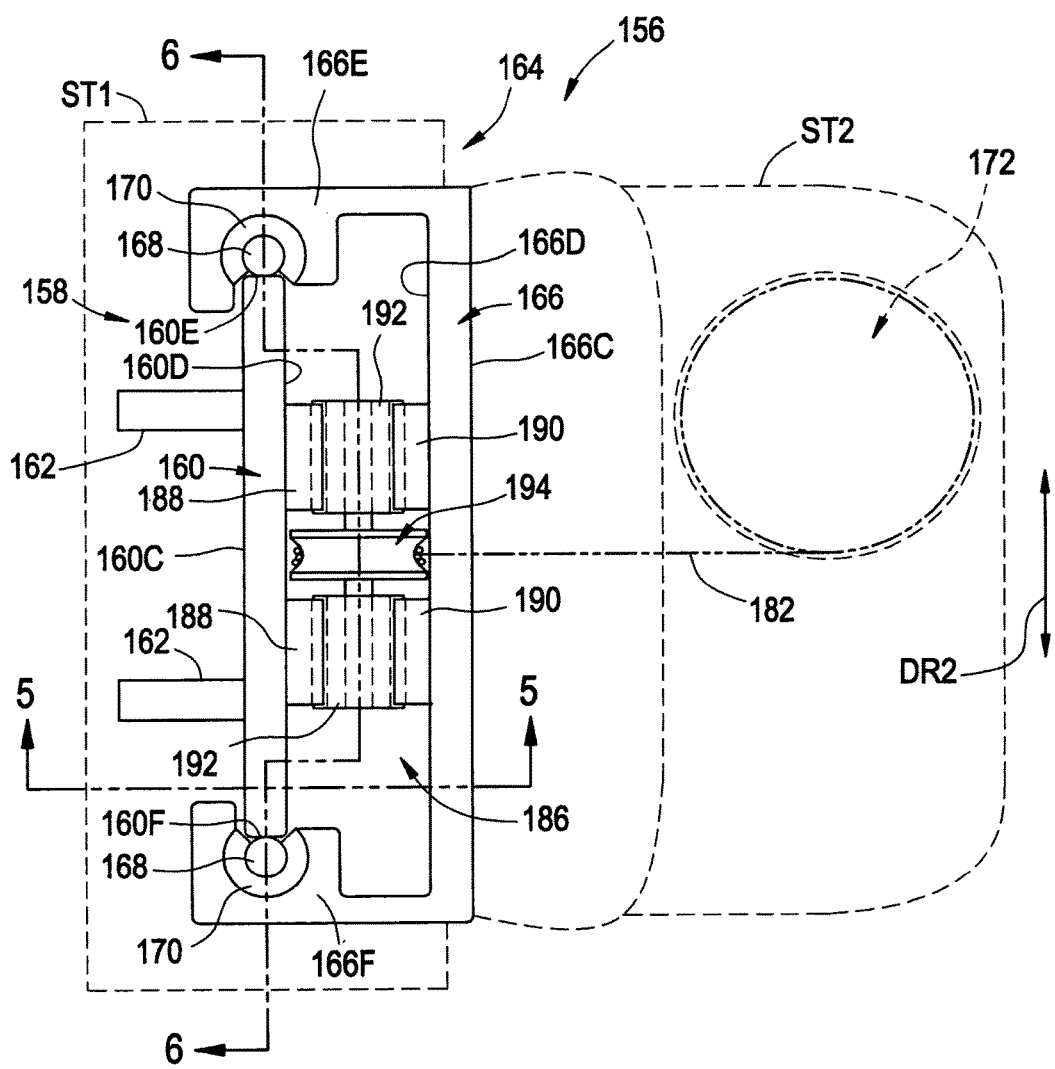
FIG. 4 is a top plan view of the suspension system in FIG. 3.

Suspension system 156 includes a first or supporting assembly 158 that is supported on and, in some cases, fixedly attached to structure ST1. First assembly 158 can include a base or supporting wall 160 that can be secured on or along structure ST1 in any suitable manner, such as by way of a flowed-material joint (not shown) and/or by one or more securement devices (not shown), such as threaded fasteners, for example. Depending upon the forces and loads associated with suspension system 156, first assembly 158 can, optionally, include one or more gussets or buttress walls 162 that can extend between base wall 160 and structure ST1. Base wall 160 can extend in a first or longitudinal direction, which is represented in FIG. 3 by arrow DR1, from a first or proximal end 160A disposed toward structure ST1 to a second or distal end 160B. Base wall 160 can also include a first side or surface 160C from which buttress walls 162 can extend and a second side or surface 160D facing opposite the first surface. Base wall 160 can extend in a second or lateral direction, which is represented in FIG. 4 by arrow DR2, that is transverse to the first direction between a first edge wall 160E and a second edge wall 160F disposed opposite the first edge wall.

Suspension system 156 also includes a second or supported assembly 164 that is supported on or otherwise fixedly attached to structure ST2. Second assembly 164 can include a second or supported wall 166 that can extend in first direction DR1 between a first or proximal end 166A disposed toward structure ST1 and a second or distal end 166B. Second wall 166 can also include a first side or surface 166C facing away from base wall 160 and a second side or surface 166D facing toward base wall 160. Second wall 166 can extend in lateral direction DR2 between a first edge wall 166E and a second edge wall 166F disposed opposite the first edge wall.

In some cases, second assembly 164 can be operatively connected with first assembly 158 such that relative motion between the two assemblies is maintained along a predetermined path, such as a linear path or an arcuate path, for example. In some cases, displacement between the first and second assemblies may move through an arcuate path, such as in cab suspension applications, for example, as is schematically represented by line ARC in FIG. 5, for example. In other cases, displacement between the first and second assemblies may move through a substantially linear path, such as in seat suspension applications for example. It will be appreciated that the further examples discussed herein are merely exemplary and not intended to be limiting.

As shown in FIGS. 3-6, for example, assemblies 158 and 164 are operatively connected with one another such that moment loads (i.e., cantilevered loads), such as may be due to the a weight of the operator (e.g., force FOR) on the seat, for example, can be transferred from assembly 164 to assembly 158 while maintaining an approximately linear pathway of movement MVT in direction DR1. It will be appreciated that any suitable construction and/or configuration of components can be used to establish and maintain a desired predetermined path of movement. For example, first assembly 158 can include one or more bearing tracks that can be operatively connected to base wall 160 in a suitable manner, such as by way of a flowed material joint and/or one or more threaded fasteners, for example. In the arrangement shown in FIGS. 3-6, a bearing track 168 is secured along each of first and second edge walls 160E and 160F and extends along base wall 160 in direction DR1 from proximal end 160A toward distal end 160B.

Further to the foregoing example, second assembly 164 can include one or more bearings, bushing or other guides that are dimensioned to receive or otherwise cooperatively engage bearing tracks 168 for displacement therealong. In the arrangement shown in FIGS. 3-6, second assembly 164 includes two bearings 170 disposed along each of first edge wall 166E and second edge wall 166F. It will be appreciated, however, that other configurations and/or arrangements could alternately be used. Additionally, it will be appreciated that bearings 170 can be secured on or along second wall 166 in any suitable manner, such as by way of receipt within one or more mounting passages (not numbered) and retention by way of one or retaining rings (not shown) or other components, for example.

Suspension system 156 also includes at least one torsional spring and isolator assembly operatively connected between assemblies 158 and 164. It will be appreciated that the at least one torsional spring and isolator assembly can be operatively connected between assemblies 158 and 164 in any suitable manner. In some cases, the at least one torsional spring and isolator assembly can be attached, either directly or indirectly (e.g., by way of one or more rigid or substantially rigid structural connectors), to one or more features and/or components of assemblies 158 or 164 and/or to one or more features and/or components of supporting or supported structures ST1 or ST2. In other cases, the at least one torsional spring and isolator assembly can be operatively connected and remotely actuated by way of a cable, cord or other similar connection.

As shown in FIGS. 3-6, for example, a torsional spring and isolator assembly 172 includes a first end member 174, a second end member 176 and an intermediate member 178. Torsional spring and isolator assembly 172 can also include a rotational motion-to-axial motion conversion system disposed between intermediate member 178 and one of end members 174 and 176. The system can be operative to convert rotation of the intermediate member and one of end members relative to the other one of the end members into axial displacement of the intermediate member relative to the two end members. Such a system can also include one or more biasing elements that are operatively connected or otherwise disposed between one of the end members and the intermediate member.

In the construction shown in FIGS. 3-6, end member 174 of torsional spring and isolator assembly 172 is secured on or along a mounting surface 180 of second assembly 164 and/or second structure ST2. Second end member 176 can include a sheave, pulley or other cable-engaging feature dimensioned to receive one or more windings of a cable 182 that extends at least partially around second end member 176. Assembly 164 and/or second structure ST2 can, optionally, include one or more guide elements, such as an idler pulley 184, for example, that is positioned to guide, support and/or redirect cable 182 as the cable is displaced toward and away from torsional spring and isolator assembly 172.

Suspension system 156 can also include a cable-tensioning assembly 186 operatively connected to cable 182 and operative to tension the cable against torsional spring and isolator assembly 172 under a force or load (e.g., force FOR) applied to second structure ST2 and/or second assembly 164. It will be appreciated that the cable-tensioning assembly can be of any suitable construction and/or configuration. In the exemplary arrangement shown in FIGS. 3-6, for example, cable-tensioning assembly 186 can include one or more first gear racks 188 supported on base wall 160 of first assembly 158 and one or more second gear racks 190 supported on second wall 166 of second assembly 164. One or more pinion gears 192 can be operatively engaged between gear racks 188 and 190 such that the pinion gears are displaced relative to the gear racks as assemblies 158 and 164 move relative to one another. A sheave, pulley or other cable-engaging feature 194 can be supported on or between pinion gears 192 and can be dimensioned to receive one or more windings of cable 182. It will be appreciated, however, that any other suitable configuration and/or arrangement could alternately be used.

Figure 5:
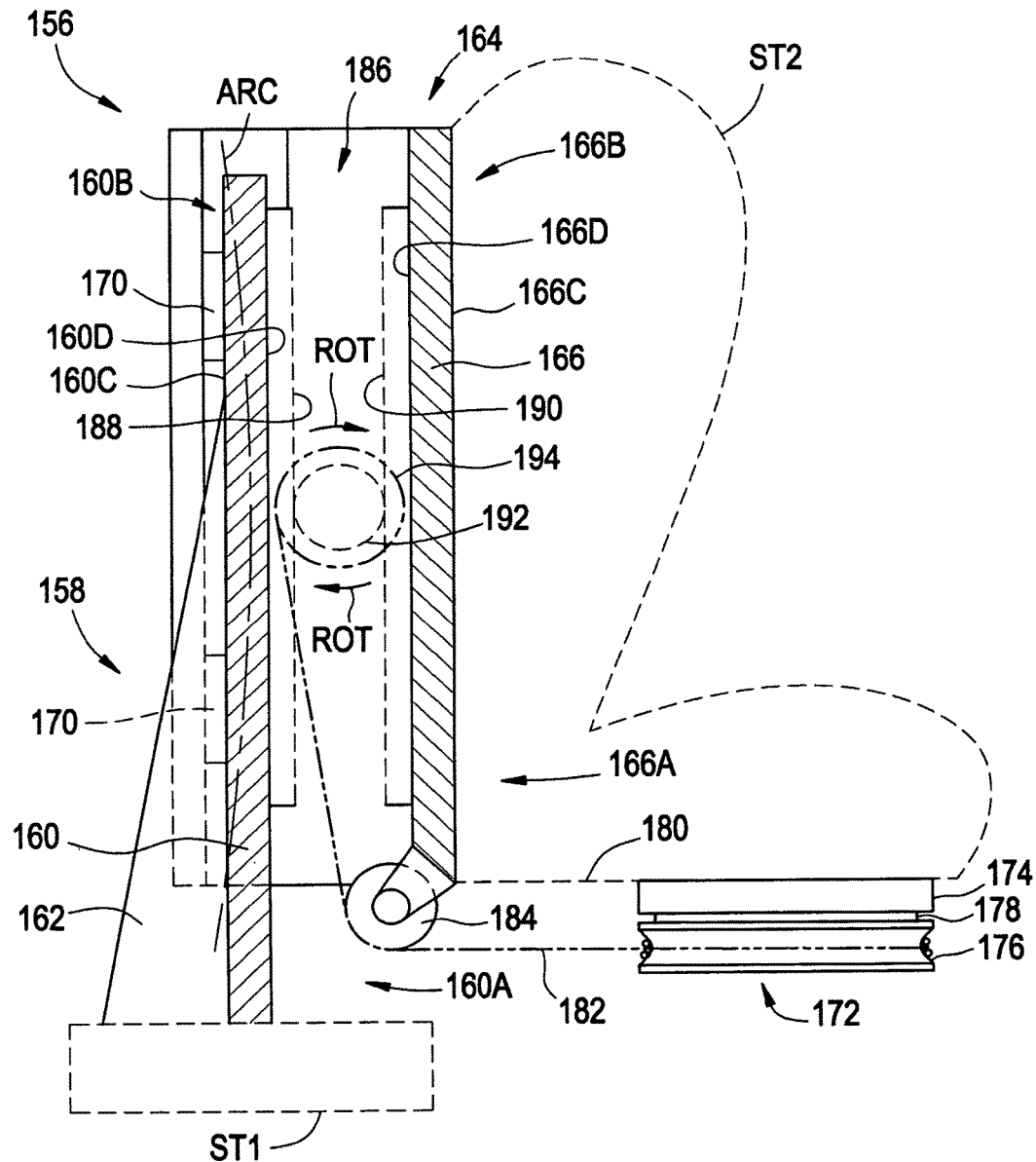
FIG. 5 is a side elevation view, in partial cross section, of the suspension system in FIGS. 3 and 4 taken from along line 5-5 in FIG. 4.
Figure 6:
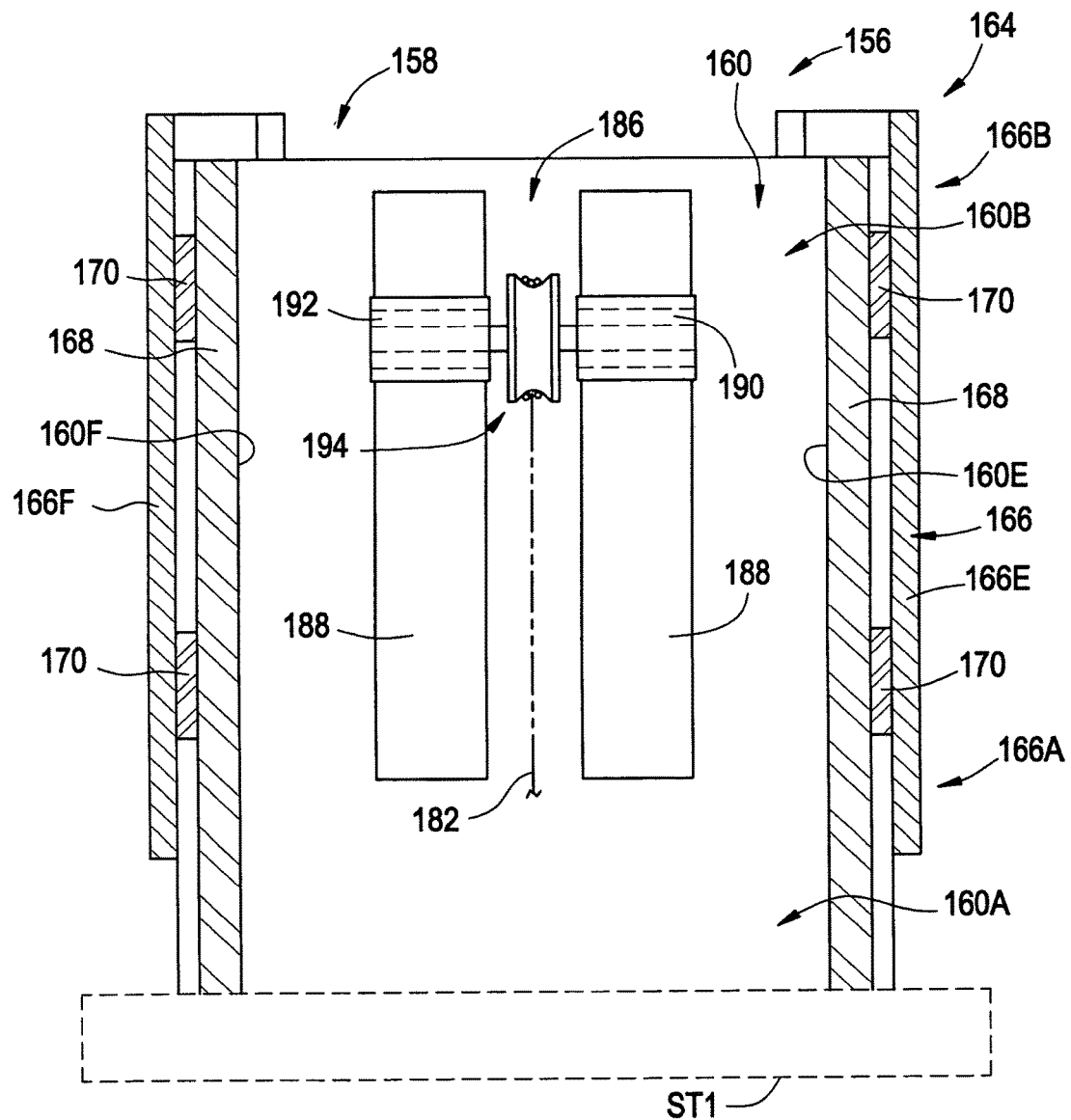
FIG. 6 is a front elevation view, in partial cross section, of the suspension system in FIGS. 3-5 taken from along line 6-6 in FIG. 4.
Figure 7:
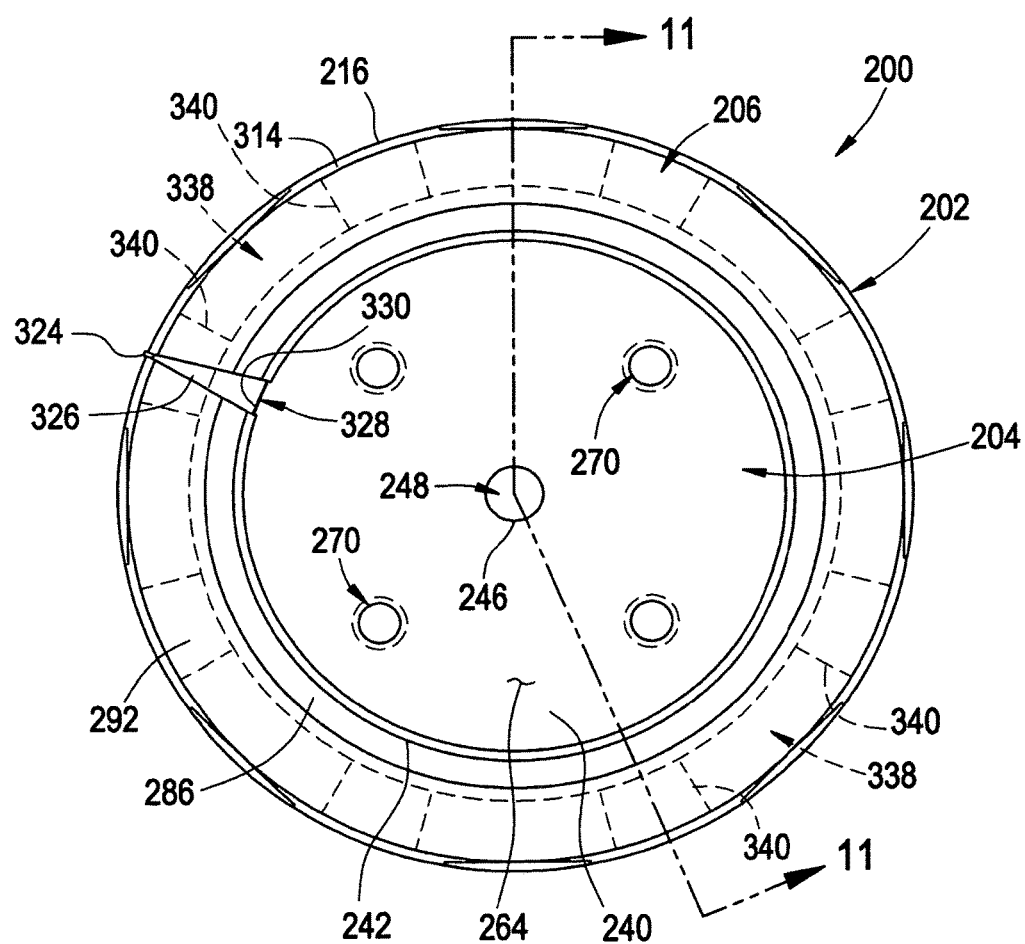
FIG. 7 is a front elevation view of one example of a torsion spring and isolator assembly of a suspension system in accordance with the subject matter of the present disclosure.

During use, force or load FOR urges second structure ST2 and second assembly 164 in a downward direction toward first structure ST1. Such action induces a clockwise rotation of pinion gears 192, as is represented in FIG. 5 by arrows ROT. Such rotation results in cable 182 being wrapped around cable-engaging feature 194 and, thus, tensioned against torsional spring and isolator assembly 172. As the tensile force acting on torsional spring and isolator assembly 172 is increased, the torsional spring and isolator assembly deflects until an equilibrium force is reached and force FOR is supported by suspension system 156.

Additionally, it will be appreciated that by reversing the direction of winding of cable 182 around cable-engaging feature 194, the suspension system can be capable of applying a force toward first structure ST1 and, thus, capable of opposing forces acting in a direction away from first structure ST1. As such, it will be appreciated that a suspension system in accordance with the subject matter of the present disclosure will generally provide support and force generation in one particular direction (e.g., extension or compression). In cases in which dual-directional forces may be useful, two or more suspension systems in accordance with the subject matter of the present disclosure could be used with one or more suspension system configured for operation in one direction and one or more other suspension systems configured for operation in the opposing direction.

Figure 8:
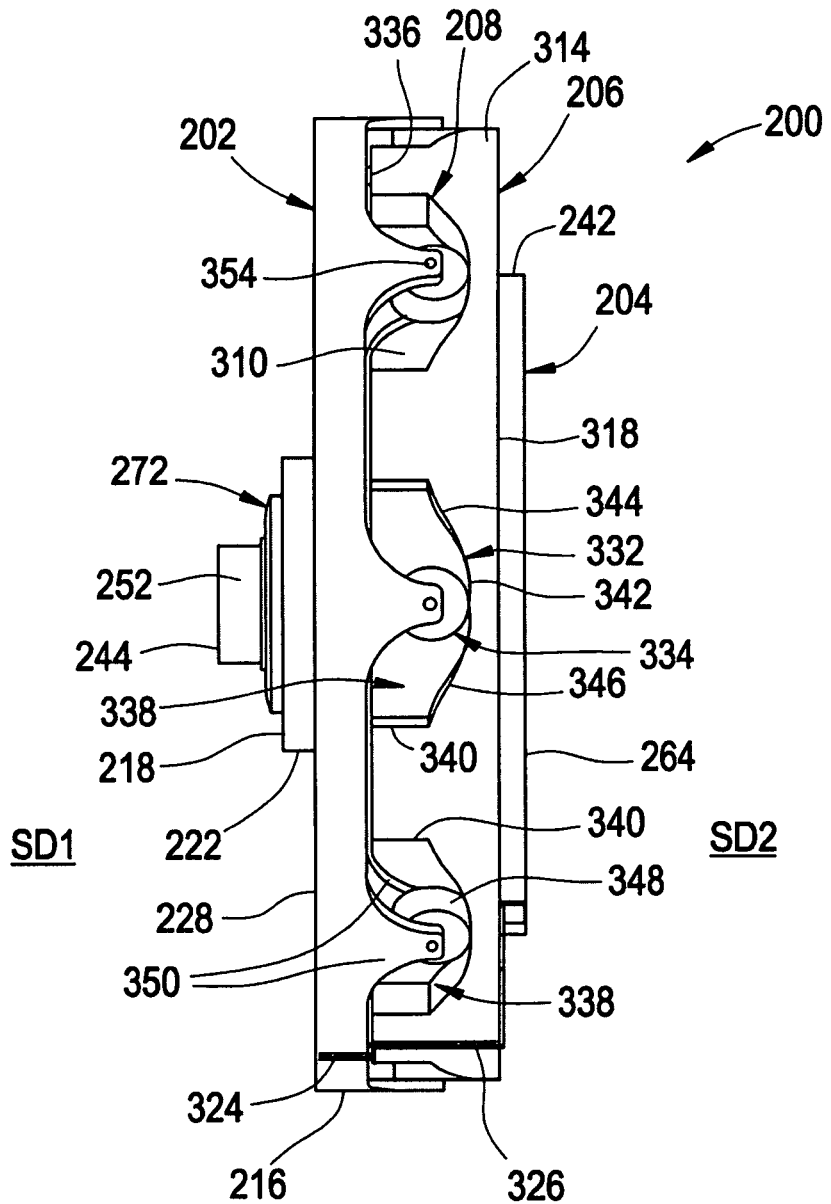
FIG. 8 is a side elevation view of the torsion spring and isolator assembly in FIG. 7.
Figure 9:
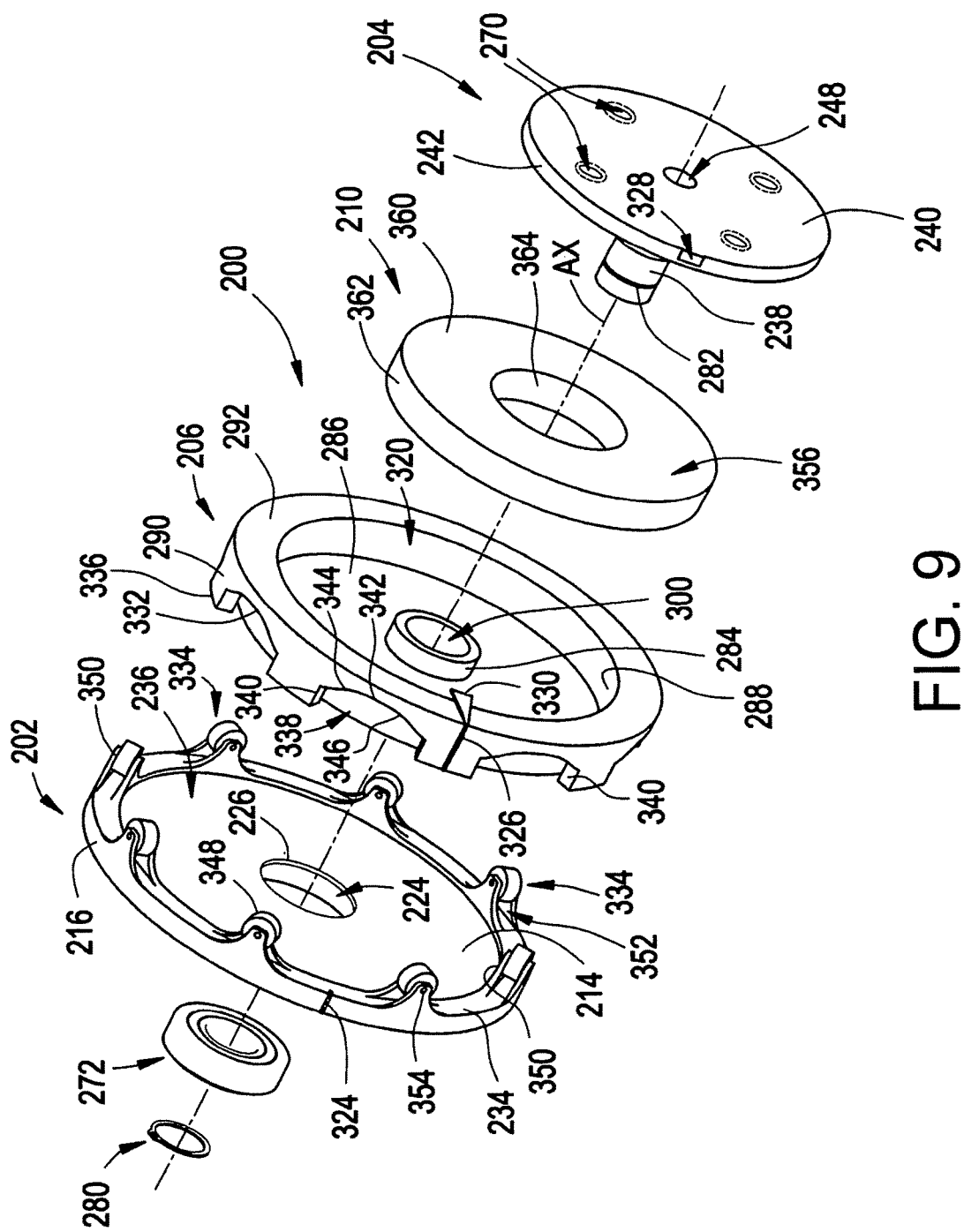
FIG. 9 is an exploded view of the torsion spring and isolator assembly in FIGS. 7 and 8.
Figure 10:
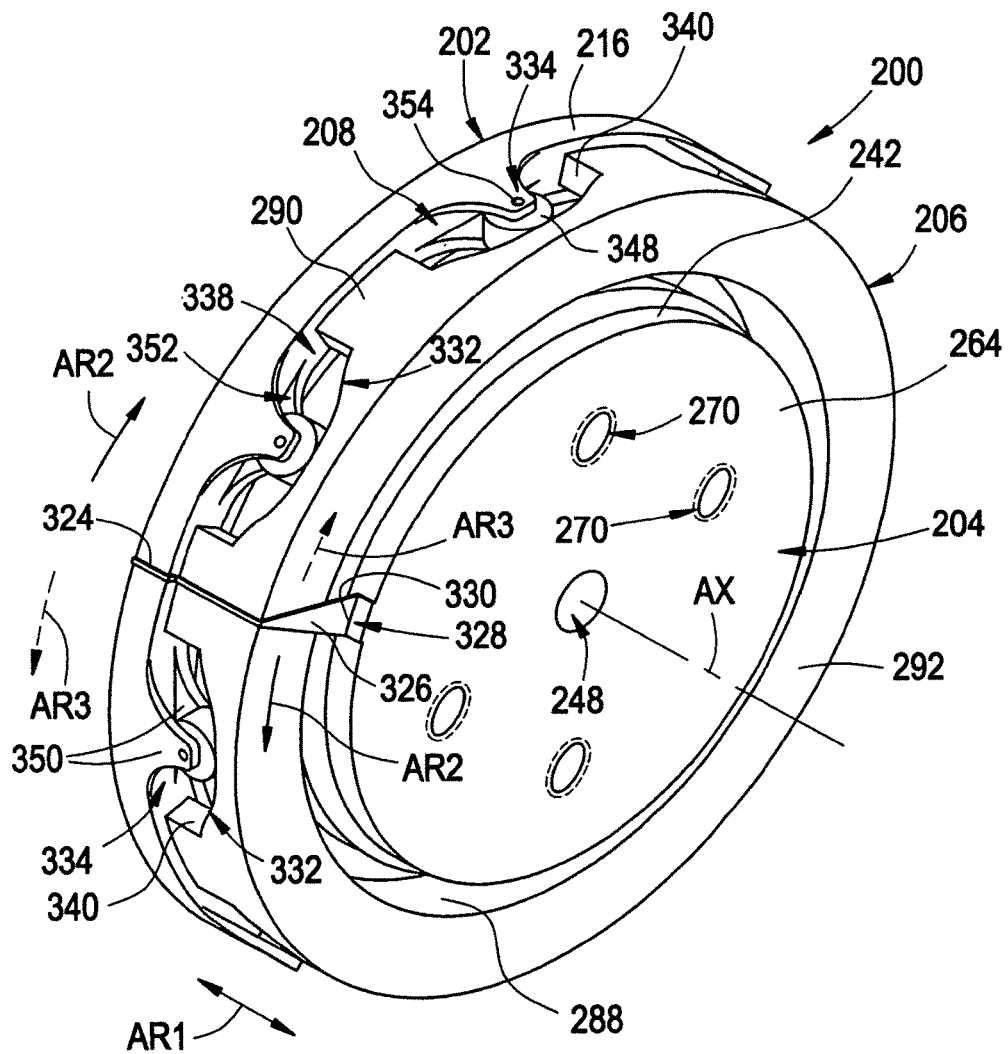
FIG. 10 is a front perspective view of the torsion spring and isolator assembly in FIGS. 7-9 shown in a first condition of operation.
Figure 11:
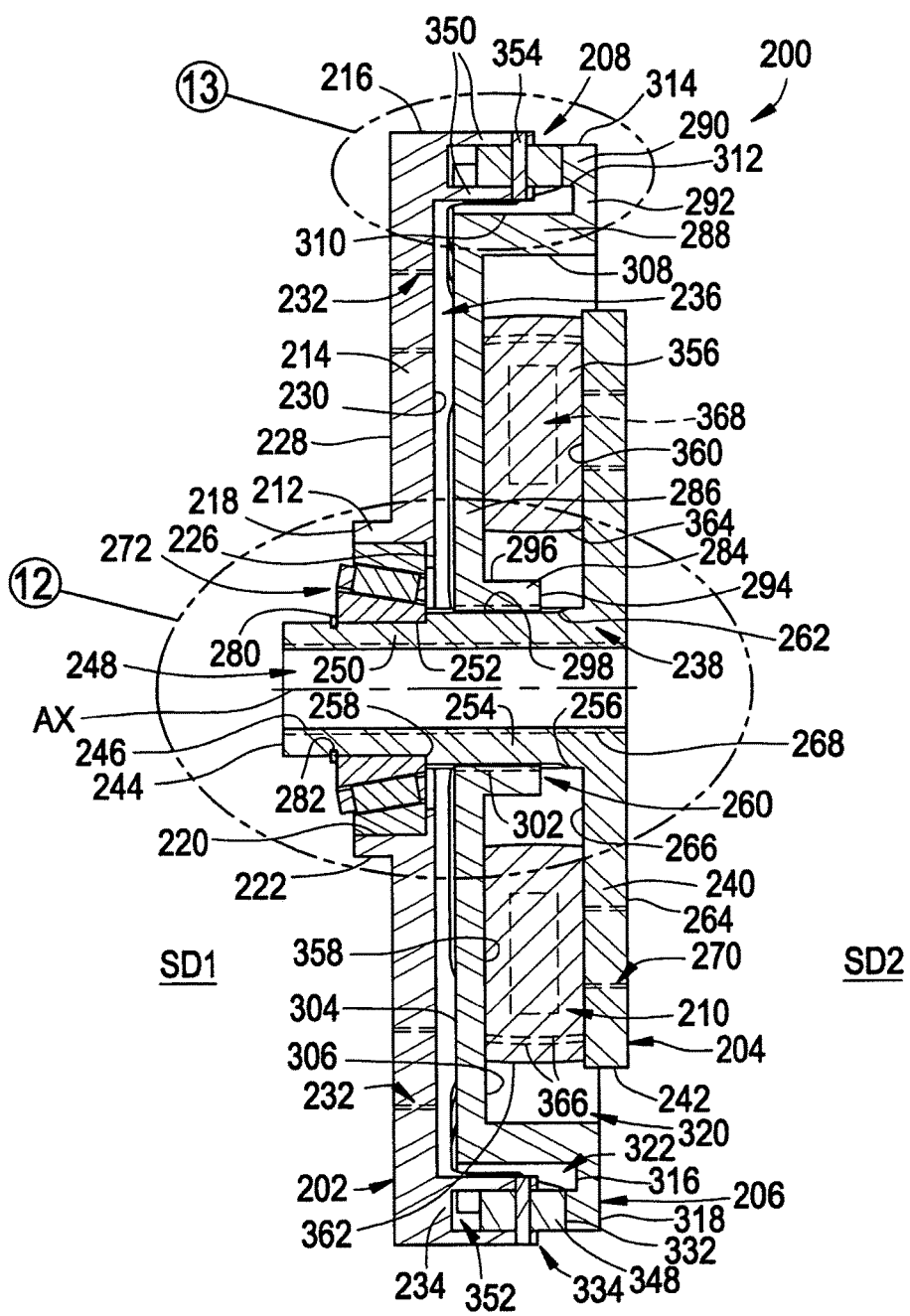
FIG. 11 is a cross-sectional side view of the torsional spring and isolator assembly in FIGS. 7-10 taken from along line 11-11 in FIG. 7 and shown in the first condition of operation.
Figure 14:
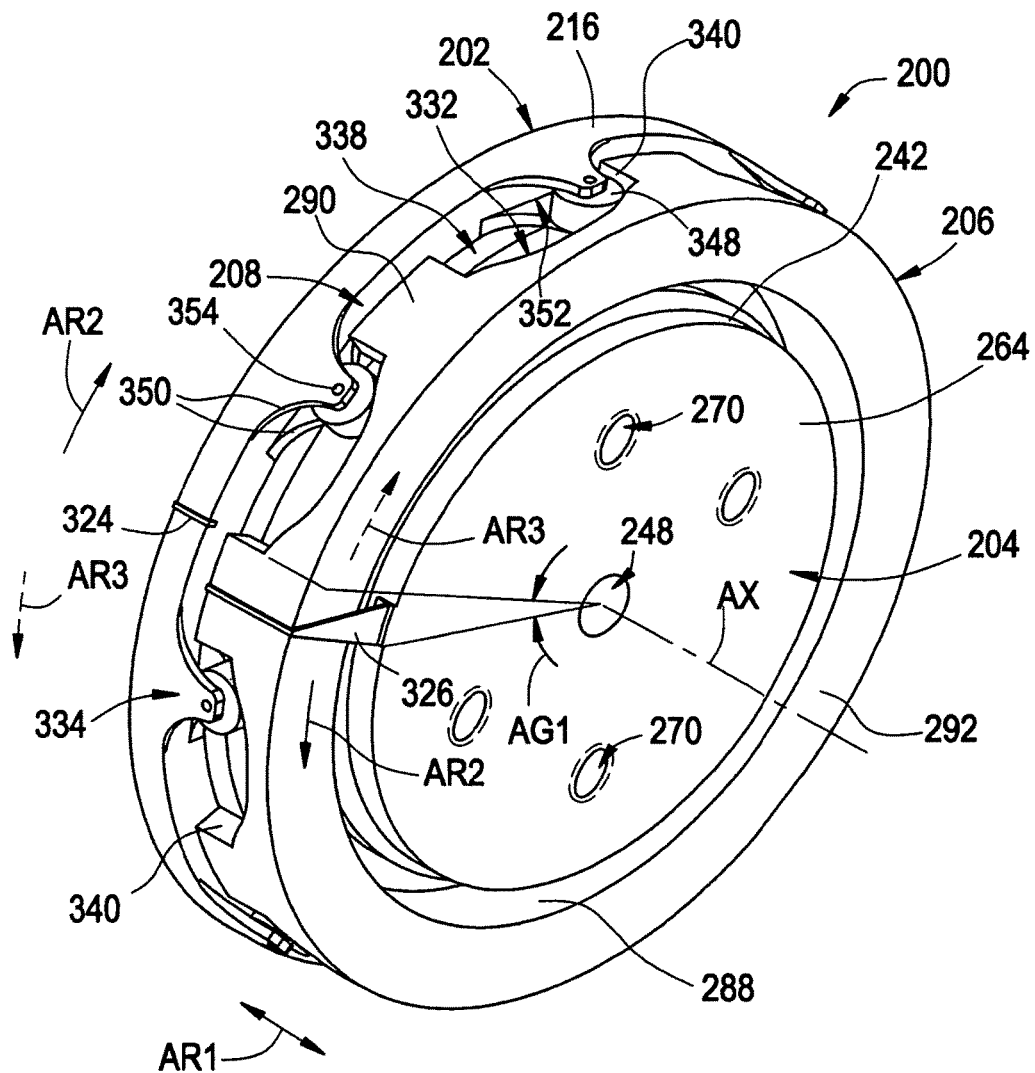
FIG. 14 is a front perspective view of the torsional spring and isolator assembly in FIGS. 7-13 shown in a second condition of operation.
Figure 15:
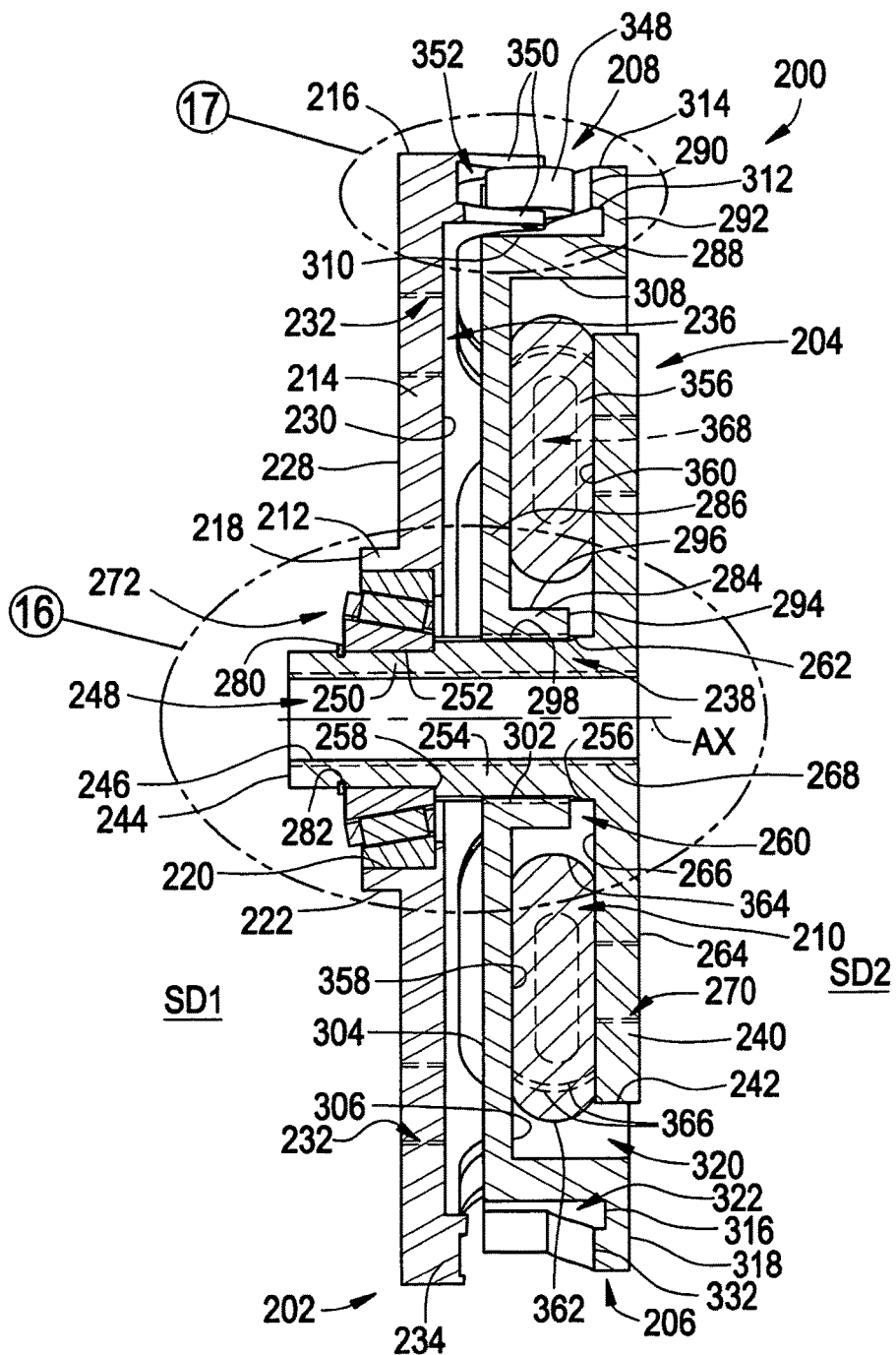
FIG. 15 is a cross-sectional side view of the torsional spring and isolator assembly in FIGS. 7-14 shown in the second condition of operation.

One example of a torsional spring and isolator assembly in accordance with the subject matter of the present disclosure, such as may be suitable for use as torsional spring and isolator assembly 172 in FIGS. 3-6, for example, is identified as a torsional spring and isolator assembly 200 in FIGS. 7-17. Torsional spring and isolator assembly 200 can have a longitudinal axis AX and can include an end member 202, an end member 204 and an intermediate member 206 that is operatively disposed between end members 202 and 204. In an assembled condition, torsional spring and isolator assembly 200 can include axially-opposed sides, which are represented in FIGS. 8, 11 and 15 by reference numbers SD1 and SD2. In some cases, one or more securement features can be accessible from along either or both of sides SD1 and/or SD2, such as may be suitable for directly or indirectly connecting one or more components (e.g., end member 202 and/or end member 204) to an associated structural component (e.g., first or second support structure ST1 or ST2) and/or an associated supported or supporting assembly (e.g., one of assemblies 158 and 164). Additionally, or in the alternative, a pulley, sheave or other cable-engaging component can be secured on or along a side of the torsion spring using one or more of the securement features, such as is shown in FIGS. 3 and 5, for example.

A torsional spring and isolator assembly in accordance with the subject matter of the present disclosure can also include a system operatively disposed between the intermediate member and one of the end members. Such a system can be operative to convert rotation of the intermediate member and one of end members relative to the other one of the end members into axial displacement of the intermediate member relative to the two end members. It will be appreciated that such a system can be of any suitable type, kind, configuration and/or construction and that the one or more components thereof can be arranged in any suitable manner. For example, torsional spring and isolator assembly 200 includes a rotational motion-to-axial motion conversion system 208 that is operatively disposed between end member 202 and intermediate member 206. In the exemplary arrangement shown in FIGS. 7-17, for example, system 208 is of a type and kind commonly referred to as an end cam and follower arrangement. It will be appreciated, however, that other configurations and/or arrangements of other types and kinds could alternately be used.

Additionally, a torsional spring and isolator assembly in accordance with the subject matter of the present disclosure can include at least one axially-acting element operatively disposed between the intermediate member and at least one of the end members. The at least one axially-acting element can be oriented and/or otherwise arranged to influence movement of the intermediate member in an axial direction. In some cases, the at least one axially-acting element can include a damping element operative to damp or otherwise dissipate kinetic energy acting on the intermediate member. In other cases, the at least one axially-acting element can include a biasing element operative to bias or otherwise urge components, features and/or elements of a rotational motion-to-axial motion conversion system (e.g., system 208) into engagement with one another. In still other cases, the at least one axially-acting element can include one or more biasing elements and one or more damping elements in any suitable combination. In the arrangement shown in FIGS. 7-17, for example, torsional spring and isolator assembly 200 includes a biasing element 210 that is operatively disposed between end member 204 and intermediate member 206. It will be appreciated, however, that other configurations and/or arrangements could alternately be used.

As indicated above, it will be appreciated that a torsional spring and isolator assembly in accordance with the subject matter of the present disclosure can include end members and one or more intermediate members of any suitable size, shape, construction, configuration and/or arrangement. As one non-limiting example, end member 202 is shown in FIGS. 7-17 as having an axis AX as well as an outboard side (not numbered) disposed toward side SD1 of the torsional spring and isolator assembly and an inboard side (not numbered) disposed toward side SD2 of the torsional spring and isolator assembly. End member 202 can include a bearing support wall 212 and a plate wall 214 that extends radially outward from along the bearing support wall toward an outer peripheral surface 216.

Bearing support wall 212 can extend in a generally axial direction from an end surface 218 disposed along the outboard side of the end member toward the inboard side of the end member. Bearing support wall 212 can include an inner surface 220 and an outer surface 222 with the inner surface dimensioned to at least partially define a passage or opening 224 (FIG. 9) that extends at least partially through end member 202. In some cases, an inner support wall 226 can extend in a radially inward direction from along bearing support wall 212 into passage 224. If provided, inner support wall 226 can include a surface (not numbered) disposed in facing relation to the outboard side (e.g., toward side SD1) of the end member and can at least partially form a recess or seat (not numbered) dimensioned to at least partially receive an associated bearing element, such as has been described hereinafter, for example.

Plate wall 214 can extend radially outward from along bearing support wall 212 toward outer peripheral surface 216 and can include a surface 228 disposed toward the outboard side (e.g., toward side SD1) and a surface 230 disposed toward the inboard side (e.g., toward side SD2). One or more securement features 232 can be accessible from on or along surface 230 of plate wall 214, such as may be suitable for securing or otherwise operatively connecting end member 202 directly or indirectly to an associated structural component (e.g., first or second support structure ST1 or ST2) and/or an associated supported or supporting assembly (e.g., one of assemblies 158 and 164). Additionally, or in the alternative, end member 202 can be operatively connected to a pulley, sheave or other cable-engaging component, such as is shown in FIGS. 3 and 5, for example. In the arrangement shown in FIGS. 11 and 15, for example, securement features 232 can take the form of threaded passages that extend at least partially into end member 202. It will be appreciated, however, that other configurations and/or arrangements could alternately be used.

In some cases, end member 202 can include one or more additional features and/or devices. As identified in FIG. 13, for example, end member 202 can include an outer peripheral wall 234 that projects outward in a generally axial direction from along surface 230 of plate wall 214. If provided, outer peripheral wall 234 can at least partially define a cavity or recess 236 (FIG. 9) extending into end member 202 from along the inboard side thereof. In a preferred arrangement, recess 236 can be dimensioned to receive at least a portion of one of more of end member 204, intermediate member 206 and/or one or more other components and/or devices (e.g., biasing elements).

End member 204 is shown in FIGS. 7-17 as having an axis AX as well as an outboard side (not numbered) disposed toward side SD2 of the torsional spring and isolator assembly and an inboard side (not numbered) disposed in facing relation to side SD1 of the torsional spring and isolator assembly. End member 204 can include a central or shaft wall 238 and a plate wall 240 that extends radially outward from along the shaft wall toward an outer peripheral surface 242.

Shaft wall 238 can extend in a generally axial direction from an end surface 244 disposed along the inboard side of the end member toward the outboard side of the end member. Shaft wall 238 can optionally include an inner surface 246 with the inner surface, if provided, dimensioned to at least partially define a passage or opening 248 that extends at least partially through end member 204. In a preferred arrangement, such as is shown in FIGS. 8, 9, 11 and 12, for example, shaft wall 238 can include a wall portion 250 having an outer surface portion 252 and a wall portion 254 having an outer surface portion 256. In some cases, wall portions 250 and 254 can be configured such that outer surface portion 256 has a greater cross-sectional dimension (e.g., diameter) than outer surface portion 252. In such cases, a shoulder surface 258 can be at least partially formed along shaft wall 238 between wall portions 250 and 254. It will be appreciated, however, that other configurations and/or arrangements could alternately be used.

Figure 12:
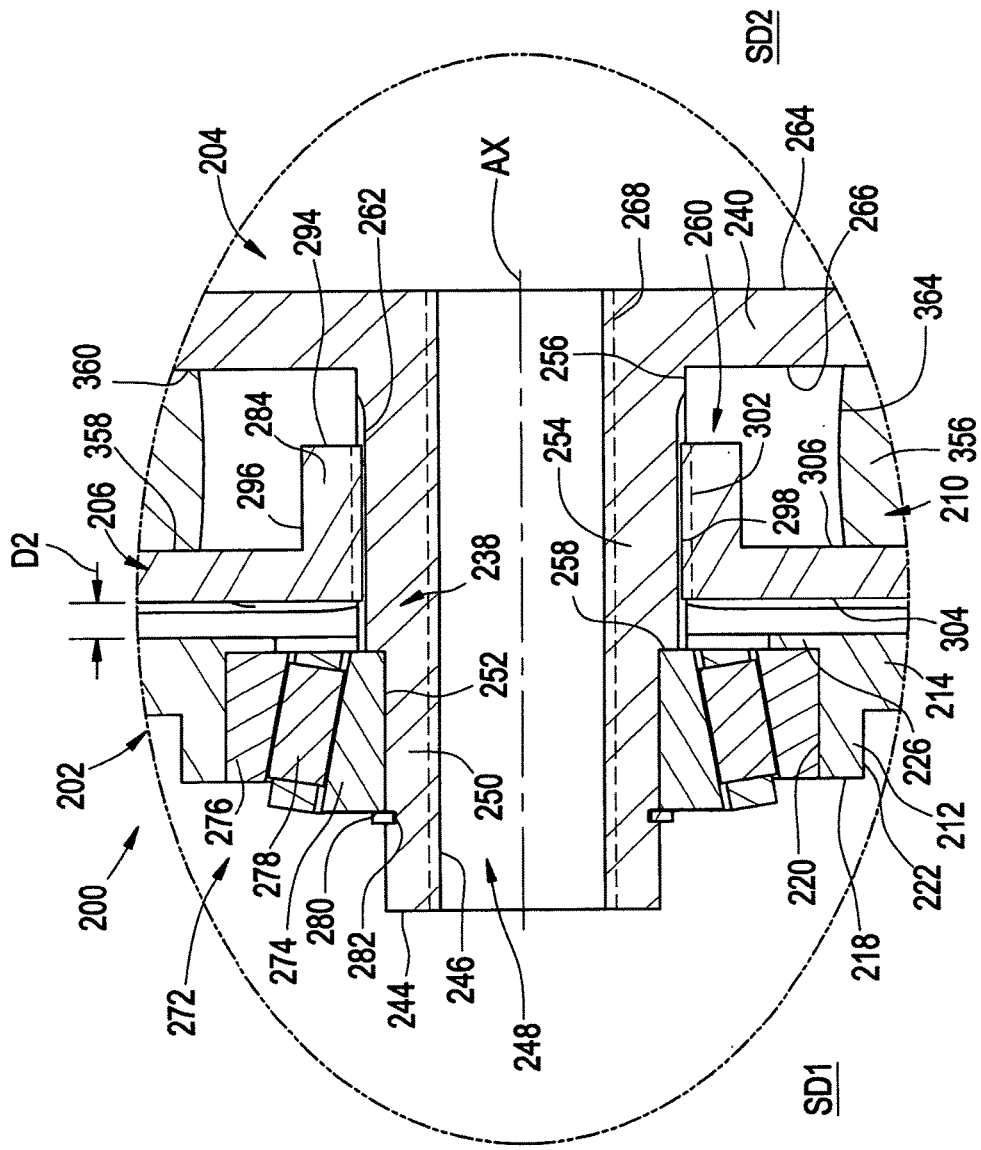
FIG. 12 is an enlarged view of the portion of the torsional spring and isolator assembly identified as Detail 12 in FIG. 11.

In a preferred arrangement, wall portion 250 and outer surface portion 252 can be dimensioned to receive or otherwise operatively engage an associated bearing element, such as is described hereinafter, for example. Additionally, in a preferred arrangement, wall portion 254 and/or outer surface portion 256 can include one or more features and/or elements suitable for forming an anti-rotation connection 260 with intermediate member 206. As one example, wall portion 254 can include one or more surfaces and/or walls that are arranged to form or otherwise at least partially establish a connection feature of anti-rotation connection 260 having non-circular cross-sectional shape. As one example, wall portion 254 can include a plurality of spline walls and/or spline surfaces, which are represented in FIGS. 11 and 12 by lines 262, that extend radially into and axially along at least a section of wall portion 254.

Plate wall 240 can extend radially outward from along shaft wall 238 toward outer peripheral surface 242 and can include a surface 264 disposed toward the outboard side (e.g., toward side SD2) and a surface 266 disposed toward the inboard side (e.g., toward side SD1). One or more securement features can be provided on or along the end member, such as may be accessible from along side SD2 of torsional spring and isolator assembly 200, for example. Such one or more securement features may be suitable for securing or otherwise operatively connecting end member 204 directly or indirectly to an associated structural component (e.g., first or second support structure ST1 or ST2) and/or an associated supported or supporting assembly (e.g., one of assemblies 158 and 164). Additionally, or in the alternative, end member 204 can be operatively connected to a pulley, sheave or other cable-engaging component, such as is shown in FIGS. 3 and 5, for example. One non-limiting example of a suitable securement feature can include an anti-rotation connection (not identified) having a non-circular cross-sectional shape or profile that is formed along surface 246, such as may be suitable for forming a torque-transmitting connection with an associated shaft or other component, for example. It will be appreciated that such an anti-rotation connection can be formed in any suitable manner, such as by way of one or more spline walls or surfaces, which are represented in FIGS. 11 and 12 by dashed lines 268, that extend radially into and axially along at least a section of shaft wall 238 from along surface 248, for example. As another non-limiting example, a plurality of securement features 270 can take the form of threaded passages that extend at least partially into end member 204, such as from along surface 264 thereof, for example. It will be appreciated, however, that other configurations and/or arrangements could alternately be used.

As indicated above, end members 202 and 204 can be operatively connected with one another such that the end members are maintained in substantially-fixed axial relation to one another while permitting the end members to rotate relative to one another, such as about axis AX, for example. It will be appreciated that the end member can be operatively connected with one another for such operation in any suitable manner and using any suitable configuration and/or arrangement of any combination of one or more components. In some cases, the end members could be maintained a substantially-fixed axial position relative to one another due to securement of the end members on or along associated structural components. In other cases, one or more features of the operative connection between the end member can maintain the end members in a substantially-fixed axial relation to one another.

A wear-reducing and/or friction-reducing element of any suitable type, kind and/or construction can be operatively disposed between end members 202 and 204 in any suitable manner. As one example, a bushing or plain bearing that is at least partially formed from a wear-reducing and/or friction-reducing material could be disposed between the end members in a manner that permits relative rotation between the end members. As another example, a bearing or bearing assembly 272 can be secured between the end members and can include an inner bearing element 274, an outer bearing element 276 and a plurality of rolling elements 278 disposed therebetween. As shown in FIGS. 11, 12, 15 and 16, inner bearing element 274 is disposed along outer surface portion 252 of wall portion 250 of end member 204. The inner bearing element can be captured on or along wall portion 250 in any suitable manner. For example, inner bearing element 274 can be disposed in abutting engagement with shoulder surface 258 and secured in position along wall portion 250 by way of base device, such as a retaining ring 280 that is at least partially received with annular groove 282 that extends radially inward wall portion 250, for example.

Outer bearing element 276 is shown in FIGS. 11, 12, 15 and 16 as being disposed along inner surface 220 of bearing support wall 212 and can be secured thereon along in any suitable manner. For example, the outer bearing element can be press-fit into the opening or passage through end member 202 and position in abutting engagement with the surface of inner support wall 226 that faces the outboard side (e.g., side SD1) of torsional spring and isolator assembly 200. End members 202 and 204 can be position relative to one another such that inner bearing element 274 and outer bearing element 276 are axially coextensive with one another. Rolling elements 278 can be disposed between the inner and outer bearing elements in a conventional manner to permit wear-reduced and/or friction-reduced movement of the inner and outer bearing elements relative to one another. It will be appreciated that rolling elements of any suitable type, kind and/or construction can be used, such as spherical ball bearings, cylindrical roller bearings and/or tapered roller bearings, for example.

As indicated above, intermediate member 206 is axially positioned between end members 202 and 204, and is operatively connected in rotationally-fixed relation to one of the end members in a manner that permits axial displacement of the intermediate member relative to the end members during use of torsional spring and isolator assembly 200. It will be appreciated that the intermediate member can be of any suitable size, shape, construction and/or configuration. As one example, intermediate member 206 is shown in FIGS. 7-17 as having an axis AX and including a central wall portion 284 and a plate wall portion 286 that extends in a radially outward direction from along the central wall portion. An inner peripheral wall portion 288 is disposed radially outward of plate wall portion 286 and an outer peripheral wall portion 290 is disposed radially outward of the inner peripheral wall portion with a connecting wall portion 292 extending therebetween. It will be appreciated, however, that other configurations and/or constructions could alternately be used.

Central wall portion 284 is shown in FIGS. 11, 12, 15 and 16 as extending from an end surface 294, which is disposed toward side SD2, in an axial direction toward plate wall portion 286. The central wall portion can include an outer surface (or outer surface portion) 296 and an inner surface (or inner surface portion) 298 that at least partially defines a passage or opening 300 (FIG. 9) that extends at least partially through intermediate member 206. As indicated above, in a preferred arrangement, central wall portion 284 and/or inner surface 298 thereof can include one or more features and/or elements suitable for forming anti-rotation connection 260 with end member 204. As one example, wall portion 284 can include one or more surfaces and/or walls that are arranged to form or otherwise at least partially establish a connection feature of anti-rotation connection 260 having non-circular cross-sectional shape. As one example, wall portion 284 can include a plurality of spline walls and/or spline surfaces, which are represented in FIGS. 11, 12, 15 and 16 by dashed lines 302, that extend outward into and axially along at least a section of wall portion 284 and correspond in mating relation to spline walls and/or spline surfaces 262 of wall portion 254 of end member 204.

Plate wall portion 286 extends radially outward from along central wall portion 284, and includes a surface 304 disposed toward side SD1 and a surface 306 disposed toward side SD2. Inner peripheral wall portion 288 extends axially from along plate wall portion 286 in a direction toward side SD2, and can include an inner surface 308 facing toward central wall portion 284 and an outer surface 310 facing away from the central wall portion. Outer peripheral wall portion 290 is spaced radially outward from inner peripheral wall portion 288, and includes an inner surface 312 disposed in spaced relation to outer surface 310 of the inner peripheral wall and an outer surface 314 that can, in some cases, for an outermost peripheral extent of intermediate member 306. Connecting wall portion 292 can extend between and operatively interconnect inner and outer peripheral wall portions 288 and 290. Additionally, connecting wall portion 292 can be disposed in axially-offset relation to plate wall portion 286, and can include a surface 316 facing toward side SD1 and a surface 318 facing toward side SD2.

Intermediate member 206 can, optionally, include a recess or cavity 320 that extends into intermediate member 206, such as from along side SD2 of the torsional spring and isolator assembly. If provided, recess 320 can, in some cases, be at least partially defined by one or more of surfaces 296, 306 and/or 308, and can include an open end (not numbered) facing toward side SD2. Furthermore, intermediate member 206 can, optionally, include a recess or cavity 322 that extends into the intermediate member, such as from along side SD1 of torsional spring and isolator assembly 200. If provided, recess 322 can, in some cases, be at least partially defined by one or more of surfaces 310, 312 and/or 316.

As indicated above, end member 204 and intermediate member 206 are operatively engaged with one another by way of at least anti-rotation connection 260, which can permit intermediate member 206 to move axially relative to end member 204 as well as to end member 202, as is represented in FIGS. 10 and 14 by arrow AR1. Additionally, anti-rotation connection 260 operates to maintain end member 204 and intermediate member 206 in a substantially-fixed rotational orientation relative to one another. As such, end member 204 and intermediate member 206 are operatively engaged with end member 202 such that end member 204 and intermediate member 206 can rotate about axis AX relative to end member 202, as is represented in FIGS. 10 and 14 by rotation arrows AR2 and rotation arrows AR3.

In some cases, torsional spring and isolator assembly 200 can, optionally, include one or more alignment indicators suitable for visually indicating a relative axial and/or rotational orientation of one or more components of the torsional spring and isolator assembly relative to one or more other components of the torsional spring and isolator assembly. For example, end member 202 is shown as including an alignment indicator 324 and intermediate member 206 is shown as including an alignment indicator 326. In some cases, a portion of the alignment indicator of the intermediate member can be connected to or otherwise operatively engage end member 204. For example, plate wall 240 of end member 204 is shown as including a recess 328 extending radially into the end member from along outer peripheral surface 242 with a distal edge 330 or other portion of alignment indicator 326 extending into recess 328. In a preferred arrangement, alignment indicator 326 is fixedly attached to the intermediate member but slidably engaged with end member 204 such that the distal edge and/or other portion of the alignment indicator disposed within recess 328 can move with intermediate member 206 relative to end member 204.

As indicated above, torsional spring and isolator assembly 200 includes rotational motion-to-axial motion conversion system 208 that is operatively disposed between end member 202 and intermediate member 206. Conversion system 208 functions to convert rotation of end member 202 relative to end member 204 and intermediate member 206 into axial displacement of the intermediate member relative to end members 202 and 204. It will be appreciated that the conversion system can include any suitable combination of features and/or components of any suitable type, kind and/or construction. For example, the conversion system can include one or more non-planar surfaces and one or more features and/or components that engage and follow the one or more non-planar surfaces.

In the arrangement shown in FIGS. 7-17, for example, conversion system 208 is shown as including a plurality of non-planar or cam surfaces 332 that are disposed in peripherally spaced relation to one another about torsional spring and isolator assembly 200. Conversion system 200 is also shown as including a plurality of cam followers 334 that are disposed in peripherally spaced relation to one another about the torsional spring and isolator assembly. In a preferred arrangement, cam surfaces 332 and cam followers 334 can be peripherally spaced from one another about axis AX such that, in an assembled condition, one or more of the cam surfaces and a corresponding one or more of the cam followers are disposed in operative engagement with one another. It will be appreciated that the opposing features, elements and/or components of conversion system 208 can be operatively disposed between the intermediate member and one of the end members (e.g., end member 202) in any suitable configuration and/or arrangement, and with any combination of one or more cam surfaces and one or more cam followers disposed on, along or otherwise between the intermediate member and the end members. As one example, all of the cam surfaces could be disposed on or along the end member with all of the cam followers disposed on or along the intermediate member. As another example, all of the cam surfaces could be disposed on or along the intermediate member with all of the cam followers disposed on or along the end member. As a further example, a combination of cam surfaces and cam followers could be disposed along the intermediate member with a corresponding combination of cam surfaces and cam followers disposed along the end member.

It will be appreciated that the cam surfaces can be formed on or along the intermediate member and/or end member in any suitable manner. As one example, cam surfaces 332 can be formed on or along outer peripheral wall portion 290. In some cases, the cam surfaces can at least partially form a distal extent of the outer peripheral wall portion. In other cases, outer peripheral wall portion 290 can extend from along connecting wall 292 in an axial direction toward a distal surface 336, which can be approximately planar. In such cases, intermediate member 206 can include cam recesses 338 that extend axially into the outer peripheral wall portion from along distal surface 336. Cam recesses 338 can include opposing side walls or surfaces 340 that are spaced apart from one another with cam surfaces 332 forming the bottom or axial extent of cam recesses 338.

Cam surfaces 332 can have a non-linear cross-sectional profile with a root surface portion 342 having an approximately planar profile segment, a first inclined surface portion 344 that extends in a first circumferential direction from along the root surface portion, and a second inclined surface portion 346 that extends from along the root surface portion in a second circumferential direction that is opposite the first circumferential direction. In a preferred arrangement, first and second inclined surface portions 344 and 346 project axially from along root surface portion 342 in a direction toward distal surface 336 and/or end member 202. In a preferred arrangement, first and second inclined surface portions 344 and 346 extend peripherally from root surface portion 342 toward side surfaces 340. In some cases, side surfaces 340 can extend in an approximately axial direction dimensioned to inhibit rotational displacement of the cam followers beyond the first and second inclined surfaces.

It will be appreciated that the cam followers can be formed on or along the intermediate member and/or end member in any suitable manner. As one example, the cam followers can be formed as wall portions of the intermediate member and/or end member that sidingly engage the corresponding cam surfaces. As another example, cam followers 334 can include one or more rolling elements, such as may assist in reducing inefficiencies and/or wear due to sliding engagement between abutting surfaces, for example. In the arrangement shown in FIGS. 7-17, for example, cam followers 334 include rolling elements 348 that are supported on or along outer peripheral wall 234 of end member 202 in a suitable manner. For example, support wall portions 350 can project from along outer peripheral wall 234 in an axial direction. The support wall portions can be spaced from one another such that a groove or slot 352 is disposed therebetween. One of rolling elements 348 can be disposed within groove 352 and retained on or along support wall portions 350 in a suitable manner, such as by way of a support pin 354 or other securement device, for example. It will be appreciated, however, that other configurations and/or arrangements could alternately be used.

As discussed above, during use of torsional spring and isolator assembly 200, end member 202 is rotatable relative to intermediate member 206 and end member 204, which are operatively connected by anti-rotation connection 260 such that intermediate and end members 206 and 204 co-rotate relative to end member 202. Torsional spring and isolator assembly 200 is shown in FIGS. 7, 8 and 10-13 in a neutral rotational orientation in which alignment indicators 324 and 326 are disposed in approximate alignment with one another. In such an orientation, cam followers 334 are, in a preferred arrangement, disposed in an approximately centered position on or along root surface portion 342 of cam surfaces 332.

Figure 16:
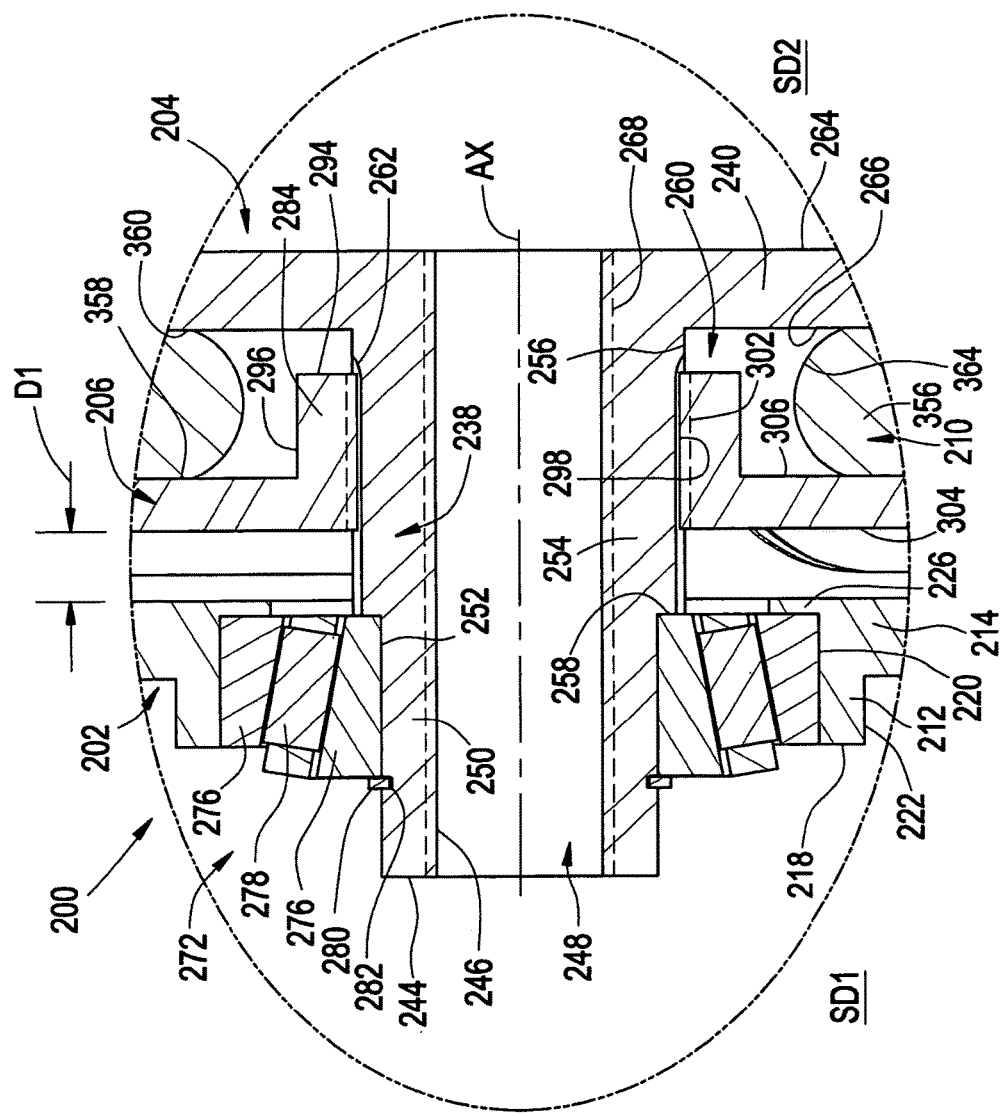
FIG. 16 is an enlarged view of the portion of the torsional spring and isolator assembly identified as Detail 16 in FIG. 15.

As end member 202 rotates relative to intermediate member 206 and end member 204, such as is represented in FIGS. 10 and 14 by arrows AR2 and/or AR3, for example, torsional spring and isolator assembly 200 reaches rotational orientation under which end members 202 and 204 are rotationally displaced through a non-zero included angle, such as is represented in FIG. 14 by angular reference dimension AG1, for example. As the torsional spring and isolator assembly moves from the neutral orientation toward a rotational orientation, cam followers 334 are displaced along root surface portion 342 and into engagement with one of inclined surface portions 344 and/or 346. As cam followers 334 are displaced along one of the inclined surface portions toward a corresponding one of side surfaces 340, the profile or contour of the inclined surface portion forces intermediate member 206 to be displaced in a direction away from end member 202 and toward end member 204, such as is represented in FIG. 16 by reference dimension D1. Under such conditions, the one or more axially-engaging elements of the torsional spring and isolator assembly, which can include one or more biasing elements, can be changed from a first potential energy condition or state to a second potential energy condition or state that is greater (i.e., has greater stored potential energy) than the first potential energy condition, such as by being tensioned and/or compressively due to the displacement of intermediate member 206 relative to end members 202 and 204.

As the torsional spring and isolator assembly moves from a rotational orientation back toward a neutral orientation, cam followers 334 are displaced along root surface portion one of the inclined surface portions 344 and/or 346 toward root surface portion 324. As the cam followers are displaced along the inclined surface portions, the profile or contour of the inclined surface portions allows intermediate member 206 to be displaced or otherwise move away from end member 204 and toward end member 202, such as is represented in FIG. 12 by reference dimension D2, which is less than reference dimension D1. Under such conditions, the one or more axially-engaging elements of the torsional spring and isolator assembly, which can include one or more biasing elements, can revert from the second potential energy condition to the first potential energy condition.

Additionally, or in the alternative, the one or more axially-engaging elements can include one or more damping elements that operate or otherwise function to dissipate kinetic energy associated with movement of intermediate member 206 in either or both axial directions. As indicated above, anti-rotation connection 260 retains intermediate member 206 and end member 204 in a substantially-fixed rotational orientation relative to one another but permits the intermediate member to undergo axial displacement relative to end members 202 and 204, which are preferably maintained in a substantially-fixed axial relationship relative to one another.

As indicated above, the one or more axially-engaging elements can include one or more damping elements operative to dissipate kinetic energy acting on torsional spring and isolator assembly 200. It will be appreciated that the one or more damping elements, if included, can be of any suitable type, kind, construction and/or configuration. For example, the one or more damping elements could include any one or more of constructions such as piston/cylinder constructions that utilize hydraulic fluid, pressurized gas and/or other fluids as the working medium. As another example of a suitable construction, one or more flexible walls that at least partially define two or more fluid chambers and permit transfer of liquid and/or pressurized gas as a damping element. As a further example, one or more electromagnetic damping elements could be used.

Additionally, or in the alternative, the one or more axially-engaging elements can include one or more biasing elements that are operatively connected or otherwise disposed between one of the end members and the intermediate member. For example, the one or more biasing elements can be operatively connected in tension between end member 202 and intermediate member 206 could be used. As another example, one or more biasing elements that are operatively disposed in compression between end member 204 and intermediate member 206 could be used. As a further example, any combination of two or more biasing elements used in tension and/or compression between the intermediate member and one or more of end members 202 and/or 204 could be used.

It will be appreciated that the one or more biasing elements can be formed in any suitable manner and from any suitable material or combination of materials. For example, the one or more biasing elements can take the form of metal coils springs, metal leaf springs, conical disc springs (e.g., Belleville washers) and/or metal torsional springs. Additionally, the one or more biasing elements can include any number of one or more negative stiffness elements in operative combination with any number of one or more positive stiffness elements. As another example, as is identified in FIGS. 11 and 15, biasing element 210 can include a polymeric spring body 356, such as may be at least partially formed from a thermoplastic elastomer or other elastomeric material (e.g., rubber). Spring body 356 is shown as including a surface 358 disposed toward surface 306 of plate wall portion 286 and a surface 360 disposed opposite surface 358 and in facing relation to surface 266 of plate wall portion 240. Spring body 356 is also shown as including an outside surface 362 and an opposing inside surface 364 that at least partially defines an opening or passage (not numbered) extending through the spring body. In a preferred arrangement, the opening or passage is dimensioned to receive one or more of shaft wall 238 and/or central wall portion 284. In some cases, one or more reinforcing layers or plies 366 can, optionally, be at least partially embedded within spring body 356. If included, reinforcing plies 366 can inhibit or at least reduce radially-outward expansion of spring body 356 during compression, such as is illustrated in FIG. 15, for example.

In some cases, the one or more biasing elements can, optionally, be adjustable, such as by way of increasing and/or decreasing the initial spring force and/or overall spring rate of the biasing elements. It will be appreciated that such adjustability can be achieved in any suitable manner. As one example, spring body 356 of biasing element 210 can at least partially define a spring chamber or cavity 368 that is can receive and retain a quantity of pressurized gas for an extended period of time (e.g., days, weeks, months or years). In some cases, the quantity and/or pressure of gas contained within the spring chamber can be increased and/or decreased to adjust the initial spring force and/or spring rate of the biasing element. It will be appreciated, that pressurized gas can be transferred into and/or out of the spring chamber in any suitable manner, such as by way of pressurized gas system 130 and gas transfer line 148 in FIG. 2, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A vehicle comprising:
a supporting structure of said vehicle;
a supported structure of said vehicle that is displaceable relative to said supporting structure in a first direction of travel;
a cable-tensioning assembly operatively disposed between said supporting and supported structures;
a torsional spring and isolator assembly operatively secured to said supported structure, said torsional spring and isolator assembly including:
a first end member having a longitudinal axis and a second end member operatively connected to said first end member, said second end member supported in a substantially-fixed axial position relative to said first end member while remaining rotatable relative to said first end member with one of said first end member and said second end member including a cable-engaging feature to which said elongated cable is operatively attached;
an intermediate member disposed between and operatively engaging said first and second end members, said intermediate member supported on one of said first end member and said second end member and axially displaceable relative to said first and second end members, said intermediate member operatively connected in a substantially fixed rotational orientation relative to said second end member such that said intermediate member and said second end member can co-rotate relative to said first end member;

a system operatively disposed between said intermediate member and said first end member to convert rotation of said intermediate member and said second end member relative to said first end member into axial displacement of said intermediate member relative to said first and second end members; and, one or more biasing elements operatively disposed between said intermediate member and at least one of said first end member and said second end member to bias said intermediate member in an axial direction toward said first end member, said one or more biasing elements having a spring rate suitable for isolating at least one harmonic of a targeted frequency of vibration; and, an elongated cable operatively connected between said cable-tensioning assembly and said torsional spring and isolator assembly such that a load acting on said supported structure displaces said cable-tensioning assembly and thereby tensions said elongated cable against said spring and isolator assembly to support said load acting on said support structure while isolating vibrations acting on at least one of said supported and supporting structures.

2. A vehicle according to claim 1 further comprising a first support member secured to said supporting structure and a second support member secured to said supported structure with said cable-tensioning assembly operatively disposed between said first and second support members, and said torsional spring and isolator assembly secured to said second support member.

3. A vehicle according to claim 2, wherein said cable-tensioning assembly includes a cable-engaging feature rotatably supported between said supported and supporting structures.

4. A vehicle according to claim 3, wherein said cable-engaging feature includes a pulley about which one or more windings of said elongated cable are disposed.

5. A vehicle according to claim 3, wherein said cable-tensioning assembly includes a supported gear rack disposed along said supported structure and a supporting gear rack disposed along said supporting structure with a pinion gear disposed between said supported and supporting gear racks, said pinion gear including an axis of rotation oriented transverse to said first direction of travel and rotatable about said axis of rotation under displacement of said supported and supporting structures relative to one another.

6. A vehicle according to claim 5, wherein said cable-engaging feature is operatively attached to said pinion gear such that said pinion gear and said cable-engaging feature co-rotate about said axis of rotation.

7. A suspension system dimensioned to operatively interconnect associated structural components, said suspension system comprising:

a first support assembly dimensioned for securement to one associated structural component;

a second support assembly dimensioned for securement to another associated structural component, said second support assembly operatively connected to said first support assembly such that said first and second support assemblies are displaceable relative to one another in a first direction of travel;

a cable-tensioning assembly operatively disposed between said supporting and supported structures;

a torsional spring and isolator assembly operatively secured to said supported structure, said torsional spring and isolator assembly including:

a first end member having a longitudinal axis and a second end member operatively connected to said first end member, said second end member supported in a substantially-fixed axial position relative to said first end member while remaining rotatable relative to said first end member with one of said first end member and said second end member including a cable-engaging feature to which said elongated cable is operatively attached;

an intermediate member disposed between and operatively engaging said first and second end members, said intermediate member supported on one of said first end member and said second end member and axially displaceable relative to said first and second end members, said intermediate member operatively connected in a substantially fixed rotational orientation relative to said second end member such that said intermediate member and said second end member can co-rotate relative to said first end member;

a system operatively disposed between said intermediate member and said first end member to convert rotation of said intermediate member and said second end member relative to said first end member into axial displacement of said intermediate member relative to said first and second end members; and, one or more biasing elements operatively disposed between said intermediate member and at least one of said first end member and said second end member to bias said intermediate member in an axial direction toward said first end member, said one or more biasing elements having a spring rate suitable for isolating at least one harmonic of a targeted frequency of vibration; and, an elongated cable operatively connected between said cable-tensioning assembly and said torsional spring and isolator assembly such that a load acting on said supported structure displaces said cable-tensioning assembly and thereby tensions said elongated cable against said spring and isolator assembly to support said load acting on said support structure while isolating vibrations acting on at least one of said supported and supporting structures.

8. A suspension system according to claim 7, wherein said first and second support assemblies are operatively connected with one another such that said first and second support assemblies are displaceable along said first direction of travel along one of a linear path and a curvilinear path.

9. A suspension system according to claim 7 further comprising:

at least one bearing track extending along said first support assembly in said first direction of travel; and, at least one bearing operatively disposed along said second support assembly, said at least one bearing complimentary to said at least one bearing track such that upon engagement of said at least one bearing and said at least one bearing track with one another said first and second support assemblies are displaceable relative to one another in said first direction of travel.

10. A suspension system according to claim 9, wherein said first support assembly includes a base wall with two bearing tracks disposed in spaced relation to one another along said base wall, and said second support assembly includes a base wall with at least four bearings secured thereto, said at least four bearings positioned along said base wall of said second support assembly such that two bearings are operatively associated with each of said bearing tracks.

11. A suspension system according to claim 7, wherein said cable-tensioning assembly includes a cable-engaging feature rotatably supported between said supported and supporting structures.

12. A suspension system according to claim 11, wherein said cable-engaging feature includes a pulley about which one or more windings of said elongated cable are disposed.

13. A suspension system according to claim 11, wherein said cable-tensioning assembly includes first and second supported gear racks disposed in laterally-spaced relation to one another along said supported structure, first and second supporting gear racks disposed along said supporting structure in approximate alignment with said first and second supported gear racks, and first and second pinion gears disposed between corresponding ones of said first and second supported and supporting gear racks, said pinion gears disposed in approximate alignment with one another along an axis of rotation oriented transverse to said first direction of travel and rotatable about said axis of rotation under displacement of said supported and supporting structures relative to one another.

14. A suspension system according to claim 13, wherein said cable-engaging feature is operatively disposed between said first and second pinion gears such that said pinion gears and said cable-engaging feature co-rotate about said axis of rotation under displacement of said supported and supporting structures relative to one another.

15. A suspension system according to claim 7, wherein said system includes a cam and follower system operatively disposed between said intermediate member and said first end member such that rotation of said intermediate member and said first end member generates axial displacement of said intermediate member relative to said first and second end members.

16. A suspension system according to claim 15, wherein said cam and follower system includes at least one cam surface having a non- linear cross-sectional profile disposed along one of said first end member and said intermediate member, and at least one cam follower disposed along the other of said first end member and said intermediate member, said at least one cam follower dimensioned to operatively engage said at least one cam surface for displacement along said cam surface during relative rotation between said intermediate member and said first end member relative to said second end member.

17. A suspension system according to claim 7, wherein said at least one biasing element includes a polymeric spring body at least partially formed from a quantity of elastomeric material, said polymeric spring body including a spring chamber containing a quantity of pressurized gas.

18. A suspension system according to claim 17 further comprising:

a pressurized gas system including a pressurized gas source and a control device with said spring chamber of said spring body disposed in fluid communication with said pressurized gas source through said control device such that pressurized gas can be selectively transferred into and out of at least said spring chamber.

19. A suspension system dimensioned to operatively interconnect associated structural components, said suspension system comprising:

a first support assembly dimensioned for securement to one associated structural component;

a second support assembly dimensioned for securement to another associated structural component, said second support assembly operatively connected to said first support assembly such that said first and second support assemblies are displaceable relative to one another in a first direction of travel;

a cable-tensioning assembly operatively disposed between said supporting and supported structures, said cable-tensioning assembly including first and second supported gear racks disposed in laterally-spaced relation to one another along said supported structure, first and second supporting gear racks disposed along said supporting structure in approximate alignment with said first and second supported gear racks, and first and second pinion gears disposed between corresponding ones of said first and second supported and supporting gear racks, said pinion gears disposed in approximate alignment with one another along an axis of rotation oriented transverse to said first direction of travel and rotatable about said axis of rotation under displacement of said supported and supporting structures relative to one another;

a torsional spring and isolator assembly operatively secured to said supported structure; and, an elongated cable operatively connected between said cable-tensioning assembly and said torsional spring and isolator assembly such that a load acting on said supported structure displaces said cable-tensioning assembly and thereby tensions said elongated cable against said spring and isolator assembly to support said load acting on said support structure while isolating vibrations acting on at least one of said supported and supporting structures.

20. A suspension system according to claim 19, wherein said cable-engaging feature is operatively disposed between said first and second pinion gears such that said pinion gears and said cable-engaging feature co-rotate about said axis of rotation under displacement of said supported and supporting structures relative to one another.

* * * * *